April 24, 1962

G. M. EULER 3,031,558

COMBINATION MANUAL AND AUTOMATIC TIME AND
TEMPERATURE CONTROL SYSTEMS

Filed April 29, 1960

INVENTOR.
GEORGE M. EULER
BY
Pringley, Baird Clayton,
Miller & Vogel
ATTYS.

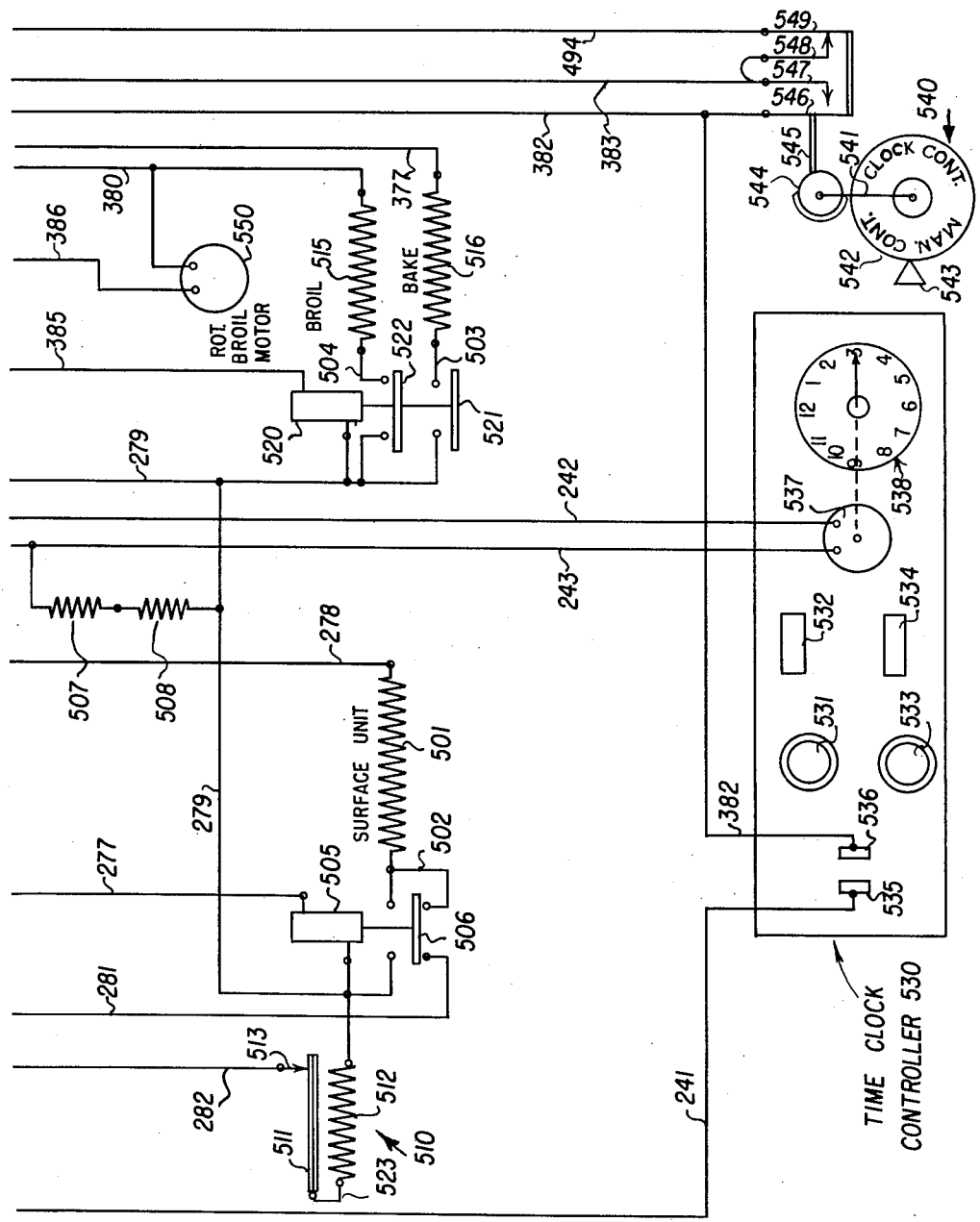

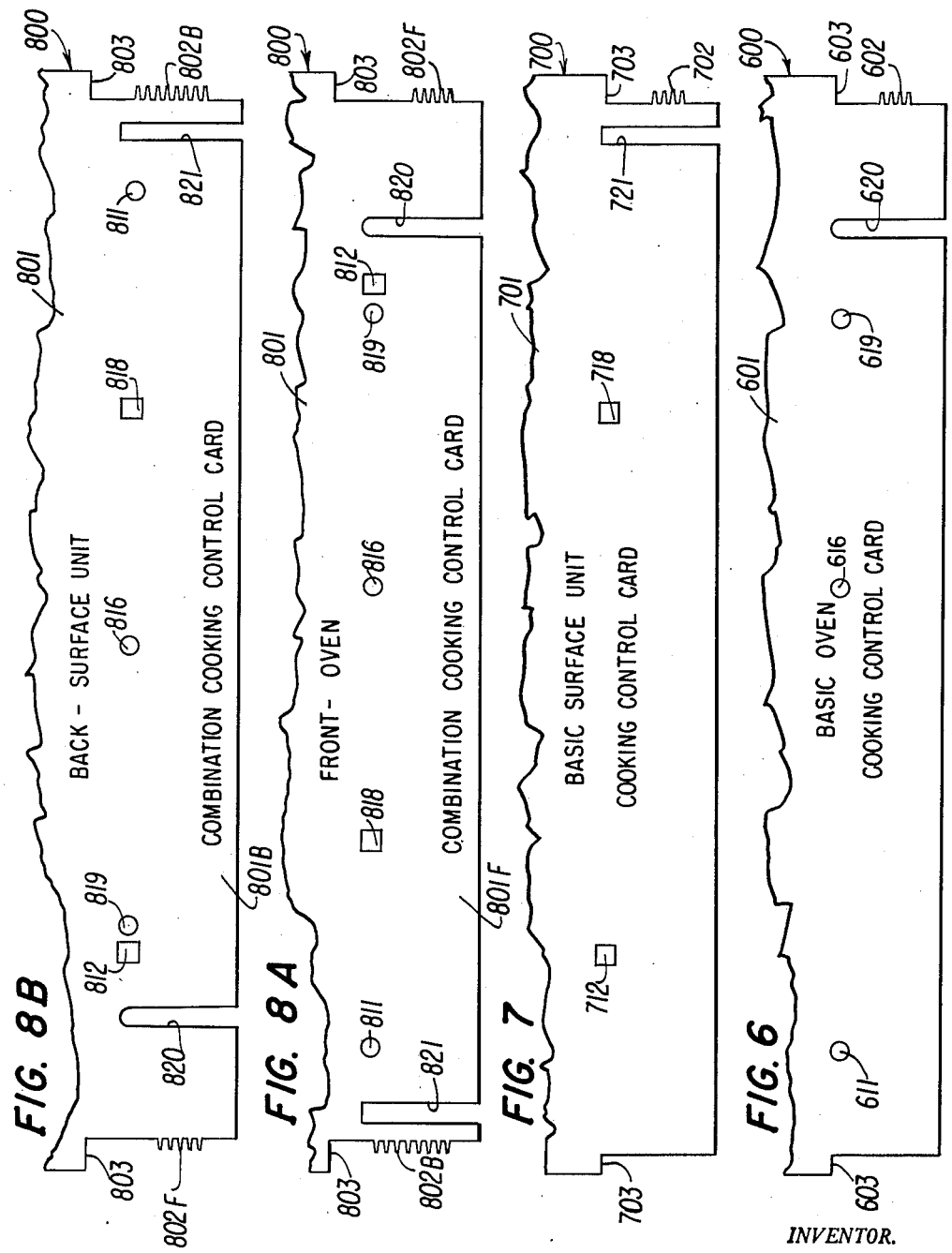

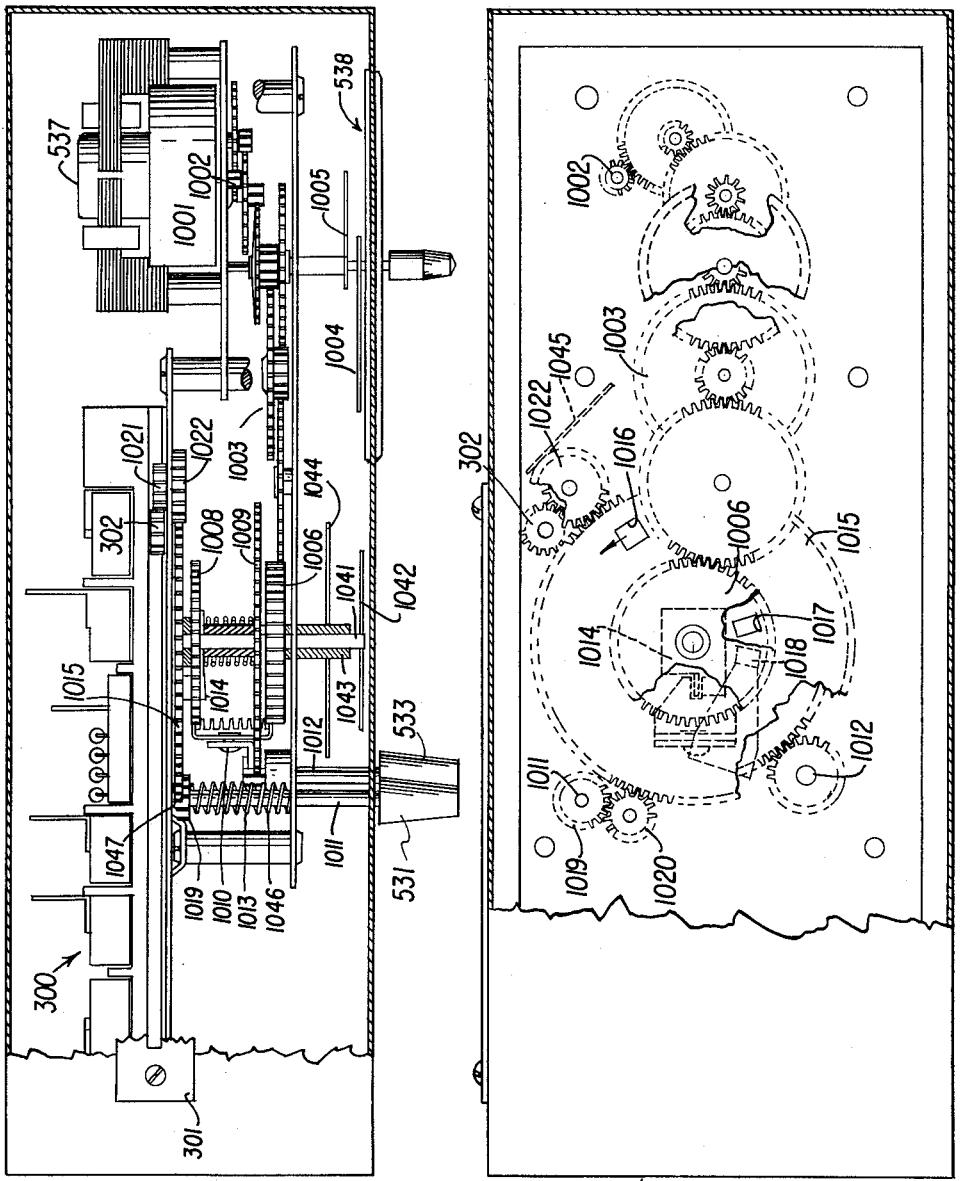

United States Patent Office 3,031,558
Patented Apr. 24, 1962

3,031,558
COMBINATION MANUAL AND AUTOMATIC TIME AND TEMPERATURE CONTROL SYSTEMS
George M. Euler, Wheaton, Ill., assignor to General Electric Company, a corporation of New York
Filed Apr. 29, 1960, Ser. No. 25,784
34 Claims. (Cl. 219—20)

The present invention relates to combination manual and automatic time and temperature control systems, and more particularly to such systems for carrying out both surface unit and oven cooking operations.

It is a general object of the invention to provide in a cooking appliance, including a surface heating unit adapted to support a cooking vessel, an improved arrangement for selectively controlling the supply of heat energy to the surface heating unit and comprising a temperature sensing unit arranged to sense the temperature of a cooking vessel supported by the surface heating unit, a manually operable controller having a plurality of control positions respectively corresponding to different desired temperatures of a cooking vessel supported by the surface heating unit, a first control circuit governed jointly by the controller in one of its control positions and by the temperature sensing unit for maintaining the temperature of a cooking vessel supported by the surface heating unit substantially at that preset by the controller in its one control position, a card magazine adapted selectively to receive a removable cooking control card, a cooking control card adapted to be placed in the magazine, and a second control circuit governed jointly by the card in the magazine and by the temperature sensing unit for maintaining the temperature of a cooking vessel supported by the surface heating unit substantially at a given temperature pre-established by the card in the magazine.

Another object of the invention is to provide in a cooking appliance of the character described, clock mechanism operatively associated with the magazine, and facility whereby the placement of the card in the magazine automatically registers in the clock mechanism a given cooking time interval for the surface heating unit cooking operation, which cooking time interval is pre-established by the card in the magazine.

Another general object of the invention is to provide in a cooking appliance, including a heating unit operatively associated with an oven cavity, an improved arrangement for selectively controlling the supply of heat energy to the heating unit and comprising a temperature sensing unit arranged to sense the temperature of the oven cavity, a manually operable controller having a plurality of control positions respectively corresponding to different desired temperatures in the oven cavity, a first control circuit governed jointly by the controller in one of its control positions and by the temperature sensing unit for maintaining the temperature of the oven cavity substantially at that preset by the controller in its one control position, a card magazine adapted selectively to receive a removable cooking control card, a cooking control card adapted to be placed in the magazine, and a second control circuit governed jointly by the card in the magazine and by the temperature sensing unit for maintaining the temperature of the oven cavity substantially at a given temperature pre-established by the card in the magazine.

Another object of the invention is to provide in a cooking appliance of the character described, clock mechanism operatively associated with the magazine, and facility whereby the placement of the card in the magazine automatically registers in the clock mechanism a given cooking time interval for the oven cooking operation, which cooking time interval is pre-established by the card in the magazine.

A further object of the invention is to provide in a cooking appliance, including a plurality of different cooking areas, a corresponding plurality of manually operable controllers respectively corresponding to the different cooking areas and for respectively controlling the temperatures of the cooking operations in the corresponding cooking areas, a card magazine adapted selectively to receive a removable cooking control card, a plurality of cooking control cards respectively corresponding to the different cooking areas and adapted to be placed individually in the magazine, and facility whereby the placement in the magazine of any one of the cards corresponding to one of the cooking areas seizes away from the corresponding one controller the control of the temperature of the cooking operation in the one cooking area and pre-establishes by the placement of the one card in the magazine of a corresponding given temperature for the cooking operation in the one cooking area.

A still further object of the invention is to provide in a cooking appliance of the character described, clock mechanism operatively associated with the magazine, facility whereby the placement of the card in the magazine automatically registers in the clock mechanism a given cooking time interval for the cooking operation in the one cooking area corresponding to the one card in the magazine, and facility governed by the clock mechanism for limiting to the registered time interval the cooking operation in the one cooking area.

Further features of the invention pertain to the particular arrangement of the elements of the automatic time and temperature control system, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a fragmentary front elevational view of the upper portion of an electric appliance, in the form of an electric range and incorporating a combination manual and automatic time and temperature control system, and embodying the present invention;

FIGS. 2 to 5, inclusive, taken together, are a composite electric diagram of the control system incorporated in the electric range of FIG. 1;

FIG. 6 is an enlarged fragmentary front view of the lower portion of a basic oven cooking control card that may be employed in the automatic control system;

FIG. 7 is an enlarged fragmentary front view of the front of a lower portion of a basic surface unit cooking control card that may be employed in the automatic control system;

FIG. 8A is an enlarged fragmentary view of the lower portion of the front side of a combination oven and surface unit cooking control card that may be employed in the automatic control system;

FIG. 8B is an enlarged fragmentary view of the lower portion of the back side of the combination oven and surface unit cooking control card shown in FIG. 8A;

FIG. 10 is an enlarged plan view, partly broken away, of the time clock controller and control card magazine that is incorporated in the automatic control system;

FIG. 11 is an enlarged front elevational view, partly broken away, of the apparatus, as shown in FIG. 10.

In order to form a unified diagram of FIGS. 2 to 5, inclusive, each of the four corresponding sheets of drawings should be arranged in a horizontal position with FIGS. 2, 3 and 4 arranged in end-to-end relation in an upper row, and with FIG. 5 positioned below FIG. 3.

SECTION 1

*The General Arrangement of the Control System and the Electrical Connections Incorporated Therein*

Figure 1:
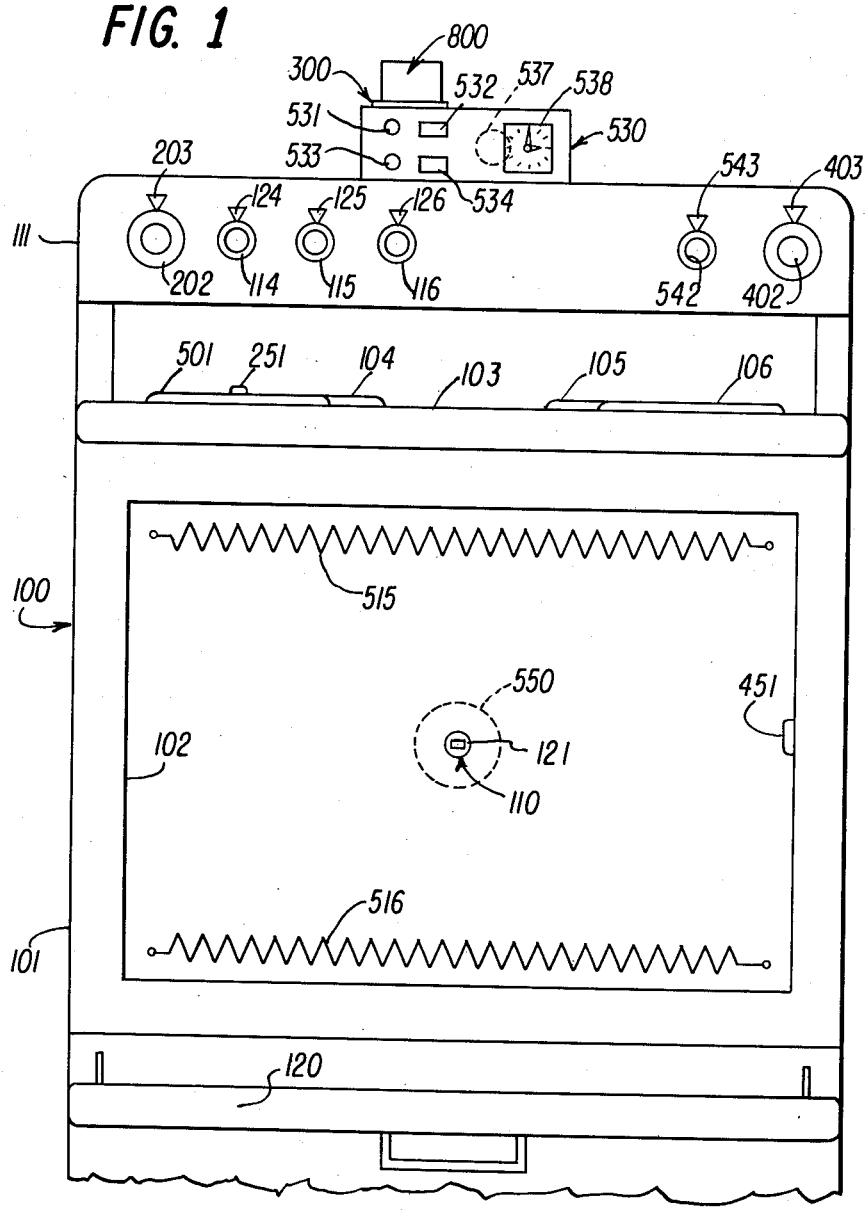

Referring now to FIG. 1 of the drawings, there is illustrated an electric cooking appliance 100, in the form of an electric range, and incorporating a combination manual and automatic time and temperature control system, and embodying the features of the present invention. The range 100 may be of the home kitchen type and comprises an upstanding body 101 in which there is arranged an oven cavity 102, and provided with a substantially horizontally disposed cooking top 103 supporting four surface heating units or hotplates 501, 104, 105 and 106 arranged in spaced-apart relation in a generally rectangular pattern.

The body 101 carries a front door 120 that is operatively associated with the oven cavity 102 and movable between closed and open positions with respect thereto, the front door 120 being illustrated in its substantially horizontal fully open position. Arranged within the oven cavity 102 are electric heating elements 515 and 516 that are employed in broiling and baking operations, as explained more fully hereinafter, the electric heating element 515 being arranged adjacent to the top of the oven cavity 102 and the electric heating element 516 being arranged adjacent to the bottom of the oven cavity 102. Also rotary broil mechanism 110 is incorporated in the oven cavity 102 that includes a rotatably mounted chuck 121 disposed adjacent to the center of the rear wall of the oven cavity 102; which chuck 121 is adapted removably to receive a substantially horizontally disposed spit, not shown, that projects, when in use, from the rear wall of the oven cavity 102 forwardly toward the front door 120 in its closed position; which spit is employed for the usual rotary broil cooking operation. The chuck 121 is rotated at a relatively low speed by a connected electric motor 550 disposed rearwardly of the rear wall of the oven cavity 102. Further, a temperature sensing device, in the form of a thermistor 451, is arranged in the right-hand side wall of the oven cavity 102 and responsive to the temperature therein for the temperature control purpose, as explained more fully hereinafter.

The cooking top 102 carries an upstanding backsplash 111 adjacent to the rear thereof that, in turn, carries control instrumentalities including the manually operable control dials or knobs 202, 114, 115, 116, 542 and 402. The rotatably mounted dials 202, 114, 115 and 116 respectively selectively control the surface units 501, 104, 105 and 106 and respectively cooperate with the associated index markers 203, 124, 125 and 126. The rotatably mounted dials 542 and 402 respectively selectively control the electric heating elements 515 and 516 incorporated in the oven cavity 102, as well as the rotor broil motor 550, and respectively cooperate with the associated index markers 543 and 403.

The surface unit 501 is of special construction, while the surface units 104, 105 and 106 may be of conventional construction. More particularly, the surface unit 501 may be of the construction and arrangement of that disclosed in U.S. Patent No. 2,822,455 that was granted on February 4, 1958, to Robert J. Molyneaux and Kenneth H. Walkoe, and essentially comprising a heating unit that may be of the fundamental construction disclosed in U.S. Patent No. 2,563,443, granted on August 21, 1951, to Oliver G. Vogel and Francis E. Kirk, and embodying a helical coil or spiral of a heating element of the metal sheath-helical resistance conductor type disclosed in U.S. Patent No. 1,367,341, granted on February 1, 1921, to Charles C. Abbott. Accordingly, the surface unit 501 comprises a plurality of turns or convolutions of heating element arranged in radially spaced-apart relation and defining a cooking platform adapted to support and to heat a cooking vessel, or the like; which platform has a centrally disposed opening therein in which there is movably mounted a temperature sensing unit 252, in the form of a thermistor, that is biased into cooperating relation with the bottom wall of a supported cooking vessel. In the temperature sensing unit 251, there is incorporated a temperature sensing element that is formed of thermistor material as previously noted. This temperature sensing element 251 has a high negative temperature coefficient of resistance, and the material may consist of sintered aluminum oxide and an oxide of magnesium, manganese, titanium, iron, nickel, cobalt, zinc, etc. For example, this thermistor may have the exceedingly high negative temperature coefficient of resistance of: $-0.044$ ohm/ohm/° C.; whereby the characteristic thereof may be as follows:

| Temperature (° C.): | Total resistance (ohms) |
|---|---|
| 25 | 100,000 |
| 50 | 34,000 |
| 100 | 6,000 |
| 150 | 1,700 |
| 200 | 580 |

As previously explained, the temperature sensing element 451 also essentially comprises thermistor material and may be of the character of that described above; whereby the two temperature sensing elements 251 and 451 may be fundamentally identical.

Also, the central portion of the backsplash 111 carries a time clock controller 530, as well as a cooking control card magazine 300, provided with a single upstanding enclosing casing 301 which cooking control card magazine 300 is adapted removably to receive any one of a plurality of cooking control cards, described more fully hereinafter, and including the indicated cooking control card 800. While the time clock controller 530 is described more fully hereinafter, it is noted at this point that the same comprises a time clock proper 538 that is driven by a synchronous electric timer motor mechanism 537; which time clock proper 538 constitutes a conventional electric time clock for the usual time-keeping purpose. Also the time clock controller 530 comprises a manually settable "time-to-cook" control knob 531 and a manually settable "stop-time" control knob 533. In the arrangement, the control knob 533 is manually settable to establish the clock time at which an oven cooking operation is to be terminated; which established "stop-time" is presented upon an indicator appearing in a cooperating window 534 provided in the front wall of the enclosing casing of the controller 530. On the other hand, the control knob 531 is manually settable to establish the time interval preceding the termination clock time at which the oven cooking operation is to be initiated; whereby the control knob 531 establishes the "time-to-cook" time interval; which established "time-to-cook" time interval is presented upon an indicator appearing in a cooperating window 532 provided in the front wall of the enclosing casing of the controller 530.

Figure 2:
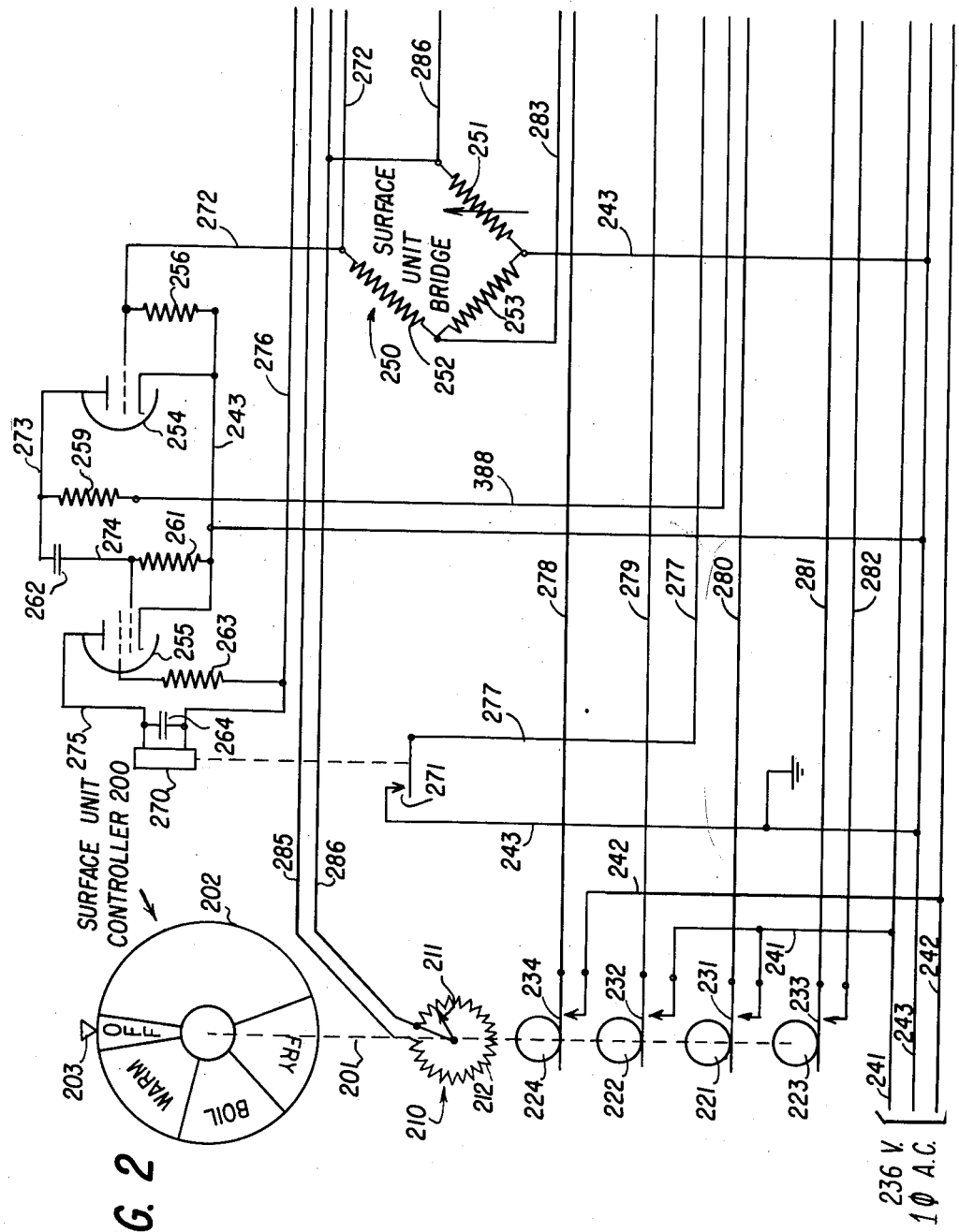
Figure 3:
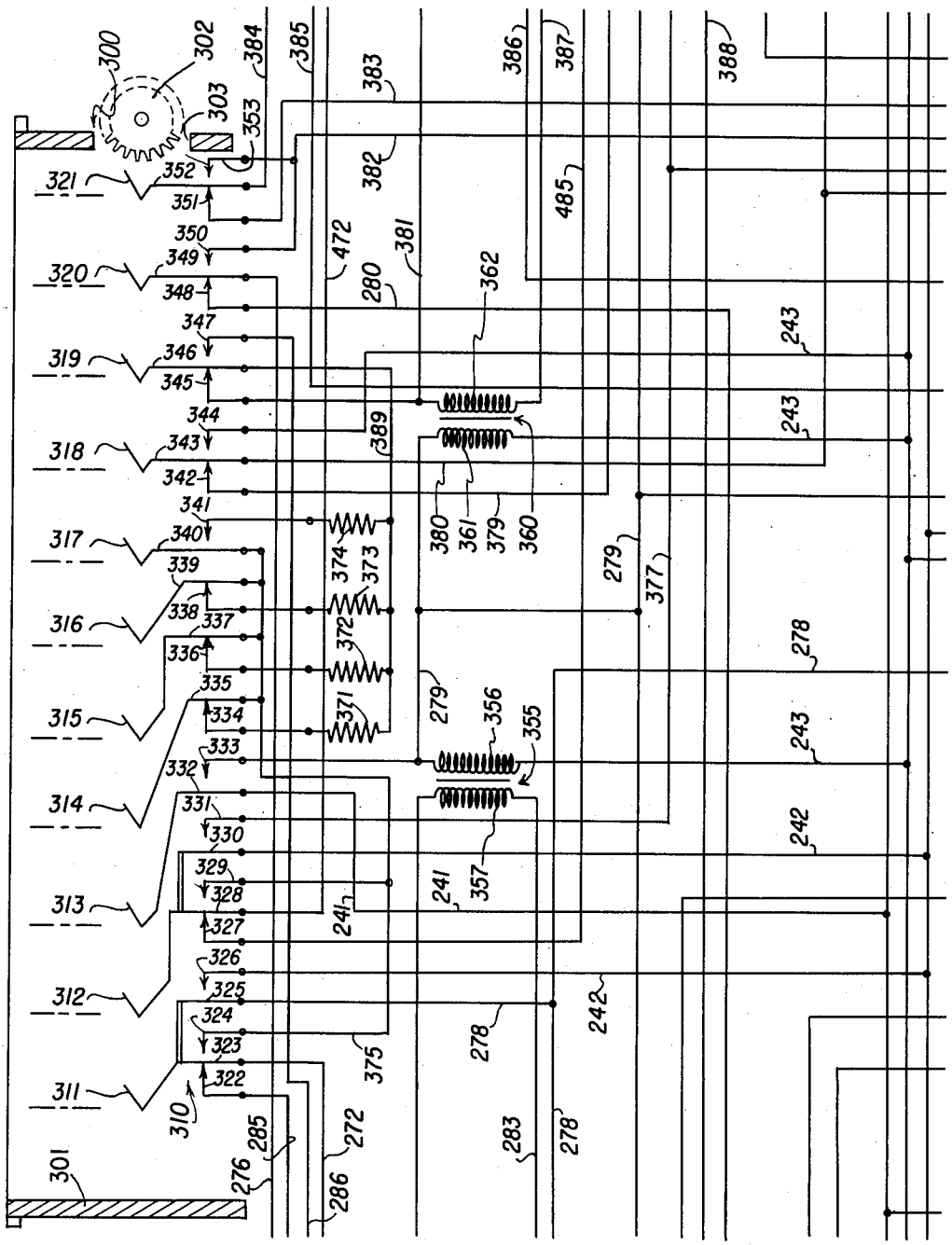
Figure 4:
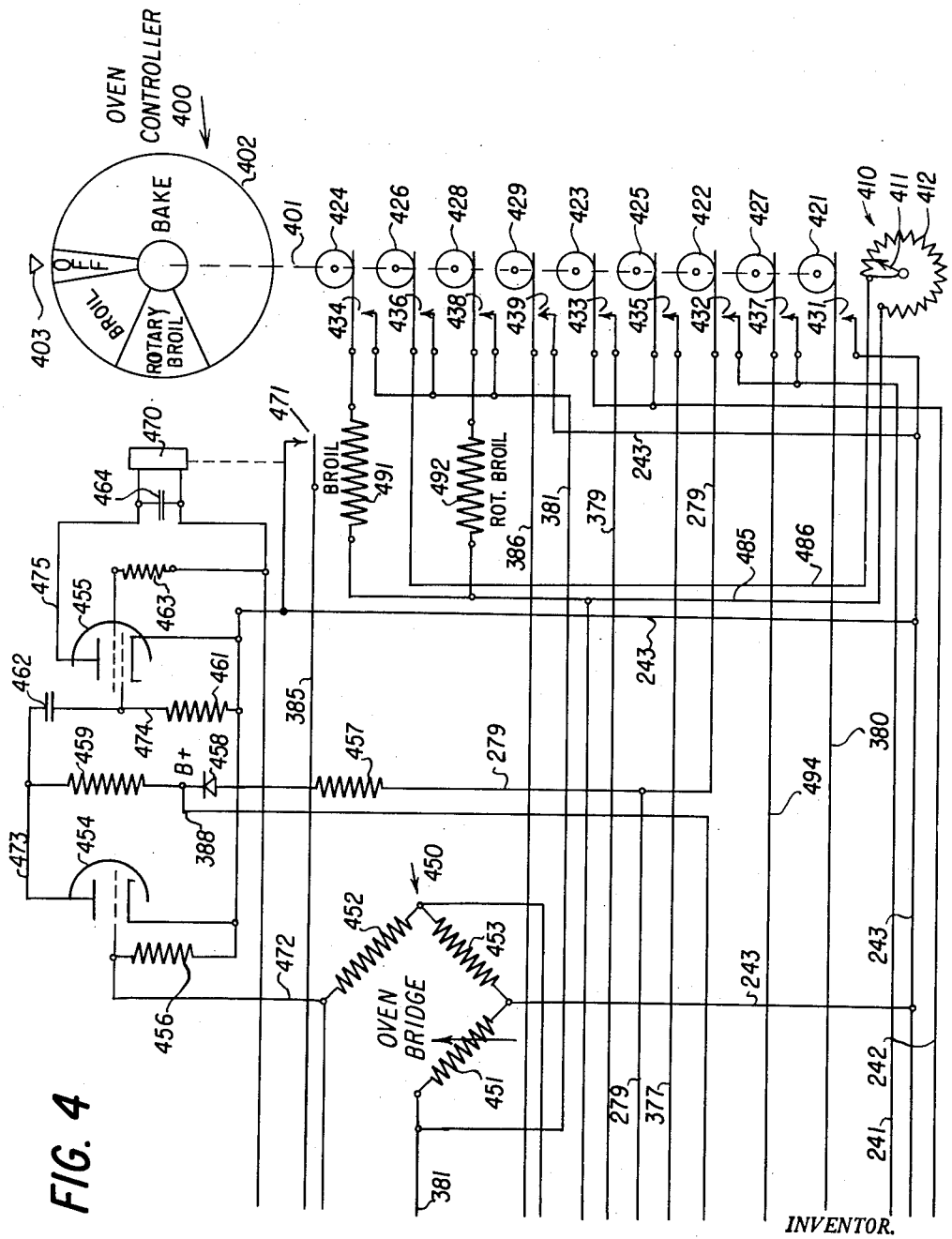

The connection and arrangement of the automatic time and temperature control system that is incorporated in the electric oven 100 is disclosed in detail in the unified diagram comprising FIGS. 2 to 5, inclusive; and referring thereto, it will be observed that the surface unit controller 200 is shown at the left-hand side of FIG. 2, the oven controller 400 is shown at the right-hand side of FIG. 4, the time clock controller 530 is shown at the bottom of FIG. 5, the cooking control card magazine 300 is shown at the top of FIG. 3, and the electric heating element of the surface unit 501 and the two oven electric heating elements 515 and 516 are shown in the middle of FIG. 5.

Continuing with the description of the control system, the surface unit controller 200 comprises a rotatably mounted operating shaft 201 carrying the manually operable dial 202 on the outer end thereof and cooperating with the associated index marker 203; which dial 202 is calibrated, carrying the angularly displaced indicia "off," "warm," "boil" and "fry." Also, the operating shaft 201 carries the contact arm 211 of a potentiometer 210, further including a resistor 212. Moreover, the operating shaft 201 carries four insulating control cams 221, 222, 223 and 224 that are respectively operatively associated with four control switches 231, 232, 233 and 234.

Similarly, the oven controller 400 comprises a rotatably mounted operating shaft 401 carrying the manually operable dial 402 on the outer end thereof and cooperating with the associated index marker 403; which dial 402 is calibrated, carrying the angularly displaced indicia "off," "broil," "rotary-broil" and "bake." Also, the operating shaft 401 carries the contact arm 411 of a potentiometer 410, further including a resistor 412. Moreover, the operating shaft 401 carries nine insulating control cams 421, 422, 423, 424, 425, 426, 427, 428 and 429 that are respectively operatively associated with nine control switch 431, 432, 433, 444, 445, 446, 447, 448 and 449.

The cooking control card magazine 300 comprises eleven individual sensing elements or feelers 311, 312, 313, 314, 315, 316, 317, 318, 319, 320 and 321 that are arranged in laterally spaced-apart relation and alignment with respect to each other and housed within the casing 301 of the magazine 300 and disposed below a cooperating card slot formed in the top of the casing 301; which feelers 311, etc., are adapted to sense or feel a cooperating cooking control card 800, etc., inserted into the card slot mentioned. As explained more fully hereinafter, certain slots or perforations are arranged in a laterally spaced-apart array in the cooperating cooking control card that selectively cooperate with the feelers 311, etc., when the cooking vessel card is inserted into the card slot provided in the top of the casing 301 of the cooking control card magazine 300. In turn, the feelers 311, etc., selectively govern a plurality of switches also housed in the casing 301; whereby the selective operation of the feelers 311, etc., by the cooperating cooking control card selectively governs the switches mentioned for the purpose of selectively setting the control circuits in the system, as explained more fully hereinafter. More specifically, the feeler 311 governs two switch springs 323 and 325, the feeler 312 governs two switch springs 328 and 300, the feeler 313 governs a switch spring 332, the feeler 314 governs a switch spring 335, the feeler 315 governs a switch spring 337, the feeler 316 governs a switch spring 339, the feeler 317 governs a switch spring 340, the feeler 318 governs a switch spring 343, the feeler 319 governs a switch spring 346, the feeler 320 governs a switch spring 349, and the feeler 321 governs a switch spring 352. The switch spring 323 cooperates with a back switch spring 322 and with a front switch spring 324; the switch spring 325 cooperates with a front switch spring 326; the switch spring 328 cooperates with a back switch spring 327 and with a front switch spring 329; the switch spring 330 cooperates with a front switch spring 331; the switch spring 332 cooperates with a front switch spring 333; the switch spring 335 cooperates with a back switch spring 334; the switch spring 337 cooperates with a back switch spring 336; the switch spring 339 cooperates with a back switch spring 338; the switch spring 340 cooperates with a front switch spring 341; the switch spring 343 cooperates with a back switch spring 342 and with a front switch spring 344; the switch spring 346 cooperates with a back switch spring 345 and with a front switch spring 347; the switch spring 349 cooperates with a back switch spring 348 and with a front switch spring 350; and the switch spring 352 cooperates with a back switch spring 351 and with a front switch spring 353.

Also a slot 303 is formed in the right-hand side wall of the casing 301 of the cooking control card magazine 300; and in the slot 303 there is mounted a toothed-wheel or pinion 302 carrying teeth projecting into the card slot mentioned; which teeth carried by the pinion 302 are adapted to cooperate with a rack provided along an edge of one of the cooking control cards, as explained more fully hereinafter; whereby the insertion of the cooking control card into the card slot provided in the top of the casing 301 of the cooking control card magazine 300 effects mesh between the rack carried by the cooking control card and the teeth carried by the pinion 302, so that the pinion 302 is rotated by such insertion of the cooking control card into the magazine 300; all for a purpose more fully explained hereinafter.

Also the system comprises a surface unit bridge 250 of the Wheatstone type and incorporating as one leg thereof the surface unit temperature sensing element or thermistor 251, as well as two individual resistance legs 252 and 253. Further, the system comprises an oven bridge 450 of the Wheatstone type and incorporating as one leg thereof the oven temperature sensing element or thermistor 451, as well as two individual resistance legs 452 and 453. A common resistance leg, that is adapted variably to include four resistors 371, 372, 373 and 374, is provided that may be selectively inserted as the fourth leg in either of the bridges 250 or 450; which composite fourth leg is selectively controlled by the switches that are respectively governed by the four feelers 314, 315, 316 and 317, as explained more fully hereinafter. A resistor 491 is provided that may be selectively inserted as the fourth leg in the oven bridge 450, incident to the carrying out of a broiling cooking operation, and governed by the oven controller 400 in its "broil" position; and similarly, a resistor 492 is provided that may be selectively inserted as the fourth leg in the oven bridge 450, incident to the carrying out of a rotary-broiling cooking operation and governed by the oven controller 400 in its "rotary-broil" position. Also, in the arrangement, the potentiometer 210 that may be selectively set by the surface unit controller 200 may be selectively inserted as the fourth leg in the surface unit bridge 250; and similarly, the potentiometer 410 that may be selectively set by the oven controller 400 may be selectively inserted as the fourth leg in the oven bridge 450.

A signal amplifying system is provided that comprises a dual triode 254—454, that may be of the 12AX7-type, as well as a dual tetrode 255—455, that may be of the 50C5-type. Specifically, the sections 254 and 454 of the dual triode mentioned are respectively operatively connected to the surface unit bridge 250 and to the oven bridge 450; while the sections 255 and 455 of the dual tetrode mentioned are respectively operatively connected to the two sections 254 and 454 of the dual triode mentioned. In turn, the outputs of the two sections 255 and 455 of the dual tetrode mentioned are respectively connected to two control relays 270 and 470. The relays 270 and 470 respectively govern two contactors 505 and 520; the contactor 505 governs the energization of the surface unit 501 and the contactor 520 governs the energization of the oven heating elements 515 and 516. Also, the contactor 505 may be selectively controlled by a cyclic device 510 that includes a bimetallic switch element 511 and an associated electric heater 512.

The surface unit bridge 250 is supplied with power from an associated transformer 355 having a primary winding 356 and a secondary winding 357; and similarly, the oven bridge 450 is supplied with power from an associated transformer 360 having a primary winding 361 and a secondary winding 362. The triode sections 254 and 454 are supplied with B+ power from a suitable crystal rectifier 458; which rectifier 458 may be of a conventional silicon crystal type.

Again reverting to the time clock controller 530, it is pointed out that the same also comprises a set of contacts 535 and 536 that normally occupy open positions with respect to each other; and in the operation of the time clock controller 530, following settings of the two manual control knobs 531 and 533, the contacts 535 and 536 are closed at a start clock time preceding the stop clock time based upon the setting of the "time-to-cook" control knob 531 and corresponding to the cooking time interval. Thereafter, the contacts 535 and 536 are opened at the stop clock time preset by the "stop-time" control knob 533. Accordingly, in a time-controlled cooking operation governed by the time clock controller 530, the contacts 535 and 536 are closed to initiate the timed cooking operation as established by the control knob 531, and the contacts 535 and 536 are again opened to terminate the timed cooking operation as established by the control knob 533. In oven cooking operations, the operation may be governed either continuously or on a timed basis under the control of the time clock controller 530, depending upon the position of a manually operable controller 540. More particularly, the manually operable controller 540 comprises a rotatably mounted operating shaft 541 carrying the manually settable dial or knob 542 on the outer end thereof that is calibrated, carrying the indicia "manual control" and "clock control" and cooperating with the index marker 543. The inner end of the operating shaft 51 carries an insulating control cam 544 that governs an insulating follower 545 cooperating with a pair of movable switch springs 546 and 549. In turn, the switch spring 546 is provided with a cooperating front switch spring 547 and the switch spring 549 is provided with a cooperating back switch spring 548. Thus it will be understood that when the manually operable controller 540 occupies its "manual control" position, the oven cooking operation is carried out on a continuous-time basis; whereas, when the manually operable controller 540 occupies its "clock control" position, the oven cooking operation is carried out on a clock-timed basis, governed upon the start clock time and the stop clock time preset in the time clock controller 530.

Considering now more particularly the connection and arrangement of the control system, the same comprises a source of power supply of the 3-wire Edison type, 236-volts, single-phase, 60-cycles, A.-C., including two outside line conductors 241 and 242 and the grounded neutral conductor 243. At the surface unit controller 200, the two springs of the switch 231 respectively terminate the line conductor 241 and a conductor 280, the two springs of the switch 232 respectively terminate the line conductor 241 and a conductor 279, the two springs of the switch 233 respectively terminate two conductors 281 and 288, and the two springs of the switch 234 respectively terminate the line conductor 242 and a conductor 278. In the oven controller 400, the two springs of the switch 431 respectively terminate the neutral conductor 243 and a conductor 380, the two springs of the switch 432 respectively terminate the line conductor 241 and a conductor 279, the two springs of the switch 433 respectively terminate the line conductor 242 and a conductor 379, the two springs of the switch 434 respectively terminate a conductor 381 and the outside terminal of the resistor 491, the two springs of the switch 435 respectively terminate the line conductor 242 and a conductor 377, the two springs of the switch 436 respectively terminate the conductor 381 and a conductor 486, the two springs of the switch 437 respectively terminate the line conductor 241 and a conductor 494, the two springs of the switch 438 respectively terminate the conductor 381 and the outside terminal of the resistor 492, and the two springs of the switch 439 respectively terminate the neutral conductor 243 and a conductor 386. The extremities of the potentiometer resistor 212 respectively terminate two conductors 285 and 286, and the conductor 286 is also connected to the arm or contact wiper 211 of the potentiometer 210; the extremities of the potentiometer resistor 412 respectively terminate two conductors 485 and 486, and the conductor 486 is also connected to the arm or contact wiper 411 of the potentiometer resistor 412; and the inside terminals of the resistors 491 and 492 are commonly connected to the conductor 485.

In the cooking control card magazine 300, the switch springs 322, 323, 325 and 326 are respectively connected to the conductor 285, a conductor 272, a conductor 375, the conductor 278 and the line conductor 242. The switch springs 327, 328, 329, 330 and 331 are respectively connected to the conductor 485, a conductor 472, the conductor 375, the line conductor 242 and the conductor 377, while the switch springs 332 and 333 are respectively connected to the line conductor 341 and to the conductor 279. The switch springs 335, 337, 339 and 340 are commonly connected to the conductor 375, while the switch springs 334, 336, 338 and 341 are respectively connected to the adjacent outer terminals of the four resistors 371, 372, 373 and 374, while the inner terminals of the four resistors mentioned are commonly connected to a conductor 389. The switch springs 342, 343 and 344 are respectively connected to the conductor 379, the conductor 380 and the neutral conductor 243. The switch springs 345, 346 and 347 are respectively connected to the conductor 481, the conductor 389 and the conductor 286. The switch springs 348, 349 and 350 are respectively connected to the conductor 280, the conductor 276 and a conductor 282. The switch springs 351, 352 and 353 are respectively connected to a conductor 383, a conductor 384 and the conductor 382.

In the manually operable controller 540, the switch springs 546, 547, 548 and 549 are respectively connected to the conductors 382, 383, 383 and 494. Also in the timeclock controller 530, the contacts 535 and 536 respectively terminate the line conductor 241 and the conductor 382. The winding of the rotary broil motor 550 is bridged across the conductors 380 and 386.

The primary winding of the transformer 355 is bridged across the neutral conductor 243 and the conductor 279, while the scondary winding 357 thereof is bridged across a pair of conductors 283 and 286. The primary winding of the transformer 360 is bridged across the neutral conductor 243 and the conductor 279, while the secondary winding 362 thereof is bridged across the conductor 381 and a conductor 387. In the bridge 250, the leg 251 is connected between the conductor 286 and the neutral conductor 243, the leg 252 is connected between the conductors 272 and 283, and the leg 253 is connected between the conductor 283 and the neutral conductor 243. In the bridge 450, the leg 451 is connected between the conductor 381 and the neutral conductor 243, the leg 452 is connected between the conductors 472 and 387, and the leg 453 is connected between the conductor 387 and the neutral conductor 243.

In the power amplifier network, the triode section 254 includes an anode connected to a conductor 273, a cathode connected to the neutral conductor 243, and a control grid connected to the conductor 272; and a grid resistor 256 is connected between the conductor 272 and the neutral conductor 243. The tetrode section 255 includes an anode connected to a conductor 275, a cathode connected to the neutral conductor 243, a control grid connected to a conductor 274 and a screen grid connected via a grid resistor 263 to the conductor 276; and a grid resistor 261 is connected between the conductor 274 and the neutral conductor 243. The control relay 270 includes a winding that is connected between the conductors 275 and 276; and also a filtering capacitor 264 is bridged across the conductors 275 and 276. Further, the conductors 273 and 274 are coupled by a capacitor 262; and the B+ conductor 388 is connected via a limiting resistor 259 to the conductor 273.

The triode section 454 includes an anode connected to a conductor 473, a cathode connected to the neutral conductor 443, and a control grid connected to the conductor 472; and a grid resistor 456 is connected between the conductor 472 and the neutral conductor 243. The tetrode section 455 includes an anode connected to a conductor 475, a cathode connected to the neutral conductor 213, a control grid connected to a conductor 474, and a screen grid connected via a grid resistor 463 to the conductor 384; and a grid resistor 461 is connected between the conductor 474 and the neutral conductor 243. The control relay 470 includes a winding that is connected between the conductors 475 and 384; and also a filtering capacitor 464 is bridged across the conductors 475 and 384; and further, the conductors 473 and 474 are coupled by a capacitor 462, and the B+ conductor 388 is connected via a limiting resistor 459 to the conductor 473. The conductor 279 is connected via a limiting resistor 457 to one terminal of the crystal rectifier 458 and the other terminal thereof is connected to the B+ conductor 388. The cathodes of the four tube sections 254, 454, 255 and 455 are heated by an associated heater 507 that is connected in series relation with a limiting resistor 508 across the conductor 279 and the neutral conductor 243. The control relay 270 is provided with a pair of contacts 271 that respectively terminate a conductor 277 and the neutral conductor 243; and similarly, the control relay 470 is provided with a pair of contacts 471 that respectively terminate a conductor 385 and the neutral conductor 243.

The winding of the contactor 505 is bridged across the conductors 277 and 279; and the winding of the contactor 520 is bridged across the conductors 385 and 279. The surface heating unit 501 is bridged across the conductor 278 and a conductor 502; the bake heating unit 516 is bridged across the conductor 377 and a conductor 503; and the broil heating unit 515 is bridged across the conductor 380 and a conductor 504. The contact bridging member 506 of the contactor 505 is provided with a pair of front contacts respectively terminating the conductors 279 and 502; and also the contact bridging member 506 is provided with a pair of back contacts respectively terminating the conductors 281 and 502. The contact bridging member 521 of the contactor 520 controls a pair of front contacts respectively terminating the conductors 279 and 503; and the contact bridging member 522 of the contactor 520 controls a pair of front contacts respectively terminating the conductors 279 and 504.

In the cyclic device 510, the electric heater 512 is bridged across the conductor 279 and a conductor 523; the conductor 523 is connected to one terminal of the thermostatic element 511; and a contact 513 that cooperates with the thermostatic element 511 is connected to the conductor 282.

SECTION 2

*The Cooking Control Cards That Are Employed in the Automatic Control System*

Automatic control of a cooking operation in the oven cavity 102 may be governed by the insertion of the basic oven cooking control card 600 of FIG. 6 into the card slot provided in the top of the cooking control card magazine 300, as shown at the top of FIG. 3; which basic oven cooking control card 600 essentially comprises a substantially rectangular body 601 formed of electrical insulating material, such, for example, as a textile reinforced phenolformaldehyde resin sheet. As illustrated, the cooking control card 600 comprises a rack 602 at the right-hand edge thereof that is adapted to engage and to rotate the pinion 302 that is incorporated in the card magazine 300; which rotation of the pinion 302 is effective to set a cooking time interval into the time clock controller 530 incident to the mere insertion of the card 600 downwardly into its home position in the magazine 300.

Also, the cooking control card 600 comprises a series of circular apertures 611, 616 and 619, as well as an elongated slot 620, formed through the body 601 thereof; which elements 611, 616, 619 and 620 are arranged in laterally spaced-apart relation coordinate with the correspondingly laterally spaced-apart feelers 311, 316, 319 and 320 provided in the magazine 300. Specifically, the elements 611, 616, 619 and 620 prevent operation of the corresponding feelers 311, 316, 319 and 320, since the elements 611, 616, 619 and 620 comprise "cut-outs" in the body 601 of the card 600. On the other hand, the solid portions of the body 601 of the card 600 that are not cut-out actuate the remainder of the feelers not designated above; whereby the feelers 312, 313, 314, 315, 317, 318 and 321 are thus actuated when the card 600 is inserted into the magazine 300. This actuation of the feelers 312, 313, 314, 315, 317, 318 and 321 brings about switching operations in the control circuit that are appropriate for the automatic control of the oven cooking operation and also effectively presets the temperature that is to be maintained in the oven cavity 102 in the automatic control cycle.

Accordingly, the insertion of the basic oven cooking control card 600 into the card magazine 300 presets both a cooking time interval and a cooking temperature for the automatic oven cooking operation; and moreover, this insertion of the card 600 into the magazine 300 takes the normal control of a cooking operation in the oven cavity 102 away from the manually operable oven controller 400, so as to prevent interference with the automatically controlled oven cooking operation by the manually operable oven controller 400. Finally, the card 600 comprises a pair of laterally spaced-apart shoulders 603 disposed in the opposite sides of the body 601 and arranged to engage the opposite sides of the casing 301 of the card magazine 300, thereby to establish the final or home position of the card 600 when it is inserted into the card slot provided in the top of the magazine 300.

Automatic control of a cooking operation on the surface unit 501 may be governed by the insertion of the basic surface unit cooking control card 700 of FIG. 7 into the card slot provided in the top of the cooking control card magazine 300, as shown at the top of FIG. 3; which basic surface unit cooking control card 700 is essentially of the same construction as the basic oven cooking control card 600 of FIG. 6, as previously described. As illustrated, the cooking control card 700 comprises a body 701 that is provided with a rack 702 at the right-hand edge thereof that is adapted to engage and to rotate the pinion 302 that is incorporated in the card magazine 300; which rotation of the pinion 302 is effective to bring about the presetting of a cooking time interval into the time clock controller 530 incident to the mere insertion of the card 700 downwardly into its home position in the magazine 300.

Also, the cooking control card 700 comprises a series of square apertures 712 and 718, as well as an elongated slot 721, formed through the body 701 thereof; which elements 712, 718 and 721 are arranged in laterally spaced-apart relation coordinate with the correspondingly laterally spaced-apart feelers 312, 318 and 321 provided in the magazine 300. Specifically, the elements 712, 718 and 721 prevent operation of the corresponding feelers 312, 318 and 321, since the elements 712, 718 and 721 comprise "cut-outs" in the body 701 of the card 700. On the other hand, the solid portions of the body 701 of the card 700 that are not cut-out actuate the remainder of the feelers not designated above; whereby the feelers 311, 313, 314, 315, 316, 317, 319 and 320 are thus actuated when the card 700 is inserted into the magazine 300. This actuation of the feelers 311, 313, 314, 315, 316, 317, 319 and 320 brings about switching operations in the control circuit that are appropriate for the automatic control of the surface unit cooking operation and also effectively presets the temperature that is to be maintained at the bottom of the cooking pot that is supported by the surface unit 501 in the automatic control cycle.

Accordingly, the insertion of the basic surface unit cooking control card 700 into the card magazine 300 presets both a cooking time interval and a cooking temperature for the automatic surface unit cooking operation; and moreover, this insertion of the card 700 into the magazine 300 takes the normal control of a cooking operation on the surface unit 501 away from the manually operable surface unit controller 200, so as to prevent interference with the automatically controlled surface unit cooking operation by the manually operable surface unit controller 200. Finally, the card 700 comprises a pair of laterally spaced-apart shoulders 703 disposed in the opposite sides of the body 701 and arranged to engage the opposite sides of the casing 301 of the card magazine 300, thereby to establish the final or home position of the card 600 when it is inserted into the card slot provided in the top of the magazine 300.

Referring now to FIGS. 8A and 8B, a combination cooking control card 800 is illustrated that comprises a combination of the functions of the two cards 600 and 700 previously described. More particularly, the card 800 comprises a body 801 having a front side 801F and a back side 801B carrying the respective indicia "front-oven" and "back-surface unit." The card 800 also comprises two racks 802F and 802B that are adapted selectively to cooperate with the pinion 303 in the manner previously explained. More particularly, when the card 800 is inserted into the card slot provided in the top of the magazine 300 with the front side 801F toward the reader, the rack 802F cooperates with the pinion 302 and an automatic oven control cycle is established in the same manner as was established by the insertion of the cooking control card 600 into the magazine 300, as previously explained. On the other hand, when the card 800 is inserted into the card slot provided in the top of the magazine 300 with the back side 801B toward the reader, the rack 802B cooperates with the pinion 302 and an automatic surface unit control cycle is established in the same manner as was established by the insertion of the cooking control card 700 into the magazine 300, as previously explained.

This combination utility is achieved in the combination cooking control card 800, as described above, by the provision in the body 801 thereof of the series of circular apertures 811, 816, 819, together with the elongated slot 820, as well as the provision of the series of square apertures 812 and 818, together with the slot 821. When the card 800 is inserted into the magazine 300 with the front side 801F toward the reader, the elements 811, 816, 819 and 820 are disposed in cooperating control relation with respect to the corresponding feelers 311, 316, 319 and 320 incorporated in the magazine 300, while the elements 821, 818 and 812 are arranged in non-interfering relation with all of the feelers incorporated in the magazine 300. On the other hand, when the card 800 is inserted into the magazine 300 with the back side 801B toward the reader, the elements 812, 818 and 821 are disposed in cooperating control relation with respect to the corresponding feelers 312, 318 and 321 incorporated in the magazine 300, while the elements 820, 819, 816 and 811 are arranged in non-interfering relation with all of the feelers incorporated in the magazine 300. The foregoing coordinate utility of the elements 811, 816, 818 and 820 in one group and of the elements 821, 818 and 812 in the other group is possible by virtue of the general asymmetrical construction of the card 800 and of the lateral array of the feelers 11, etc., in the magazine 300. Specifically referring to FIG. 3, it will be observed that the feeler 311 is spaced toward the right a relatively great distance from the adjacent left-hand end of the casing 301, whereas the feeler 321 is spaced toward the left a relatively small distance from the adjacent right-hand end of the casing 301.

Recapitulating: when the combination cooking control card 800 is inserted into the magazine 301 with the front side 801F thereof toward the reader, an automatic oven cooking control operation is preset into the control circuit; whereas, when the cooking control card 800 is inserted into the magazine 301 with the back side 801B thereof toward the reader, an automatic surface unit control operation is preset into the control circuit.

Figure 9:
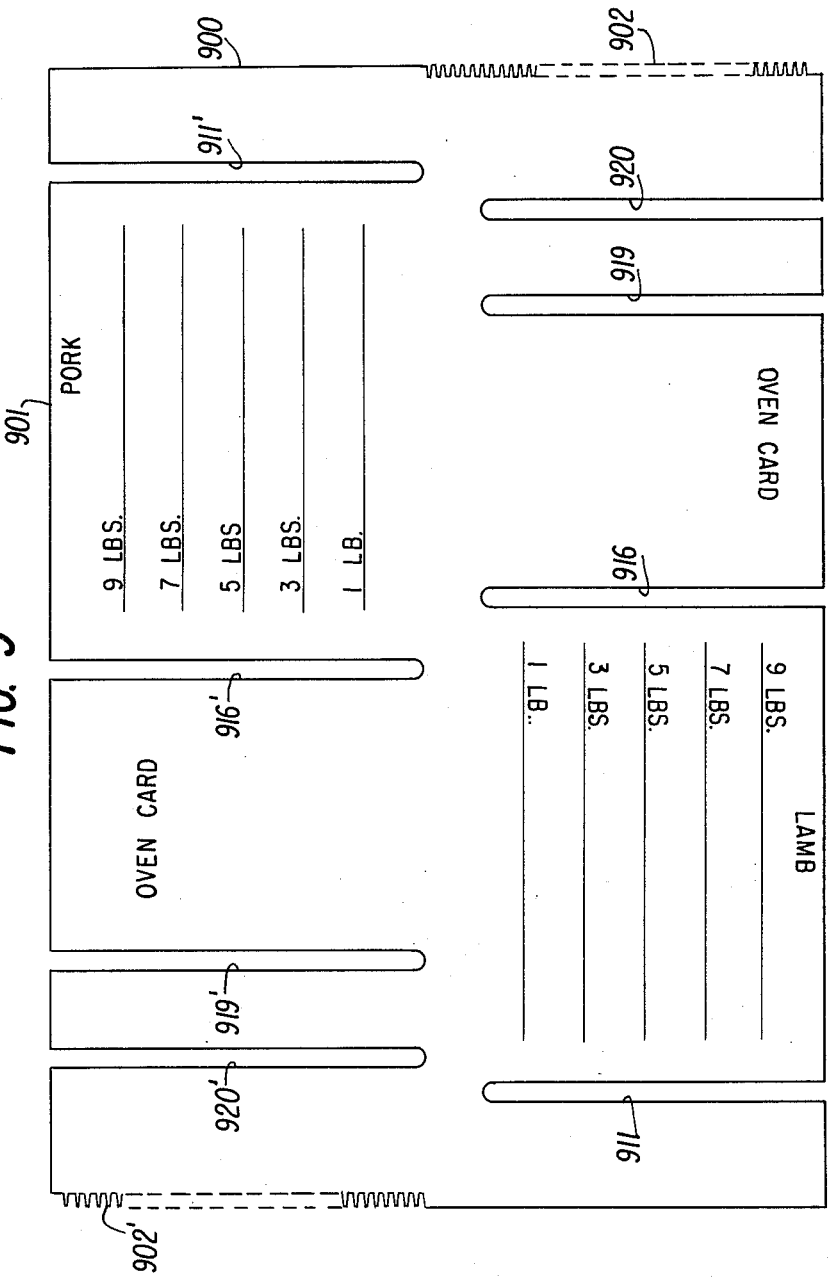
FIG. 9 is an enlarged view of one side of another oven cooking control card that may be employed in the automatic control system.

Referring now to FIG. 9, there is illustrated a modified form of the oven cooking control card 900 that is especially adapted for the cooking of pork and for the cooking of lamb in an automatic oven cooking operation; which card 900 is of the fundamental construction of the oven cooking control card 600, except that it is employed in either of two positions inverted with respect to each other in conjunction with the card magazine 300. As illustrated, the top of the card 900 is calibrated in terms of different weights of a roast of pork and the bottom of the card 900 is calibrated in terms of different weights of a roast of lamb. The lower right-hand side of the body 901 carries a rack 902 and the upper left-hand side of the body 901 carries a rack 902'; in the bottom of the body 901, a series of slots 911, 916, 919 and 920 are arranged in laterally spaced-apart relation; and in the top of the body 901, a series of slots 911', 916', 919' and 920' are arranged in laterally spaced-apart relation.

When the card 900 is inserted into the card slot provided in the top of the card magaine 300 with the legend or indicia "pork" presented to the reader, the rack 902 cooperates with the pinion 302 and the slots 911, 916, 919 and 920 are arranged in cooperating relation with respect to the corresponding feelers 311, 316, 319 and 320 located in the card magazine 300, for the purpose previously explained. Moreover, in this case, it will be observed that the weight legends "1-lb," "3-lb," etc., are arranged in sequence toward the top of the card 900 as viewed by the reader; whereby, it will be appreciated that the card 900 may be variably inserted into the cooperating card slot so as to bring one of the legends "1-lb," "3-lb," etc., into registry with the very top of the casing 301 of the card magazine 300, thereby correspondingly to cause the rack 902 to rotate the pinion 302. Thus it will be understood that when the card 900 is variably inserted into the card magazine 300, corresponding time intervals are preset into the control circuit; and also the required oven cooking temperature is preset into the control circuit.

On the other hand, when the card 900 is inverted and inserted into the card slot provided in the top of the card magazine 700 with the legend or indicia "lamb" presented to the reader, the rack 902' cooperates with the pinion 302 and the slots 911', 916', 919' and 920' are arranged in cooperating relation with respect to the corresponding feelers 311, 316, 319 and 320 located in the card magazine 300 for the purpose previously explained. Moreover, in this case, it will be observed that the weight legends "1-lb," "3-lb," etc., are arranged in sequence toward the top of the card 900 as viewed by the reader; whereby it will be appreciated that the card 900 may be variably inserted into the cooprating card slot so as to bring one of the legends "1-lb," "3-lb," etc., into registry with the very top of the casing 301 of the card magazine 300, thereby correspondingly to cause the rack 902' to rotate the pinion 302. Thus it will be understood that when the card 900 is thus variably inserted into the card magazine 300, corresponding variable cooking time intervals are preset into the control circuit; and also the required oven cooking temperature is preset into the control circuit.

SECTION 3

*The Mechanical Construction and Arrangement of the Time Clock Controller 530 and of the Cooking Control Card Magazine 300*

Considering now the mechanical construction and arrangement of the time clock controller 530 and of the cooking control card magazine 300, reference is made to FIGS. 10 to 14, inclusive. The synchronous electric timer motor mechanism 537 comprises a speed reduction gear train enclosed in a housing 1001; which gear train is provided with a drive shaft projecting exteriorly of the housing 1001 and carrying a drive gear 1002 that is rotated at a speed of 1 r.p.m.; which drive gear 1002 operates an associated gear train, indicated generally by the reference numeral 1003; whereby the minute hand 1004 and the hour hand 1005 of the clock proper 538 are rotated for the usual time-keeping purpose.

Also the gear train 1003 transmits motion to a gear 1006 that is connected by a pinion 1007 to a gear 1008, the gears 1006 and 1008 being arranged concentric with each other. Also, a gear 1009 is mounted concentric with the gears 1006 and 1008; and all three of the gears 1006, 1008 and 1009 are independently rotatably mounted, the pinion 1007 connecting together the gears 1006 and 1008. The pinion 1007 is supported on a bracket 1010 that is rigidly secured to the gear 1009 and is also rotatably mounted upon its own axis for the purpose of transmitting a relative motion between the gears 1006 and 1008. The manually operable time-to-cook control knob 531 is rigidly secured to the outer end of a corresponding rotatably mounted shaft 1011; and the manually operable stop-time control knob 533 is rigidly secured to the outer end of a corresponding rotatably mounted shaft 1012. The inner end of the shaft 1012 carries a gear 1013 that meshes the gear 1009 so that the gear 1009 can be positioned at the stop clock time at which the cooking operation is to be terminated by rotation of the stop-time control knob 533. The gear 1008 carries a spring-loaded latch member 1014 that extends through an opening therein and that is rotatable therewith. A time gear 1015 is also mounted concentric with the gears 1006, 1008 and 1009 and is independently rotatable with respect thereto and is provided with two angularly spaced-apart slots 1016 and 1017 therein. The slot 1017 is arranged so that a tab on the latch member 1014 that projects through the gear 1008 can engage the slot 1017, so that when the tab on the latch member 1014 falls into the slot 1017, the time gear 1015 is rotated with the gear 1008; which engagement occurs at the beginning of the desired cooking time, which sets-up the actual starting time for the desired cooking operation.

A stationary spring 1018 that is carried by the supporting structure cooperates with the slot 1017 provided in the time gear 1015 so as to hold the time gear 1015 in its stopped position; and also the stationary spring 1018 fills-up the slot 1017, so that in the stopped position of the time gear 1015 the tab on the latch member 1014 can pass over the slot 1017, without falling into the same; which event occurs only when the time clock controller 530 is not set for a cooking operation.

The time-to-cook control knob 531 is carried on the outer end of the rotatably mounted shaft 1011, as previously noted; and the inner end of the shaft 1011 carries a gear 1019 that meshes another gear 1020 which meshes the time gear 1015. This arrangement permits the time gear 1015 to be rotated in the counterclockwise direction, as viewed in FIG. 11, against clock time, for the purpose of setting into the mechanism the desired time-to-cook time interval under the control of the time-to-cook control knob 531. As illustrated, the gear 1020 is capable of riding out of engagement with the time gear 1015 in the event the shaft 1011 is rotated in the clockwise direction, as viewed from the front of the casing of the time clock controller 530, and as viewed in FIG. 11. This arrangement constitutes a direction-responsive disconnecting clutch so that in setting the time-to-cook time interval into the mechanism, the shaft 1011, and the time-to-cook control knob 531 must be rotated in the counterclockwise direction, as viewed in FIG. 11.

The pinion 302 arranged in the cooking control card magazine 300 comprises a portion of an independent facility for selectively setting into the mechanism the desired time-to-cook time interval. In other words, when one of the cooking control cards 600, 700, etc., is placed in the magazine 300 and forced into its home position, the racks 602, 702, etc., carried by the control card mentioned actuate the pinion 302, thereby to set into the mechanism the desired time-to-cook time interval. Specifically, the pinion 302 meshes a gear 1021 carried upon a shaft also carrying a gear 1022, and the gear 1022 meshes the time gear 1015. Accordingly, the insertion of the cooking control card into the magazine 300 rotates the pinion 302 in the counterclockwise direction, as viewed in FIG. 11, thereby effecting rotation of the gears 1021 and 1022 in the clockwise direction, with the result that the time gear 1015 is rotated in the counterclockwise direction, as viewed in FIG. 11. This rotation of the time gear 1015 in the counterclockwise direction sets the time-to-cook time interval into the mechanism in a manner identical to that previously explained in conjunction with the manual setting of the time-to-cook time interval into the mechanism utilizing the time-to-cook control knob 531.

Figure 12:
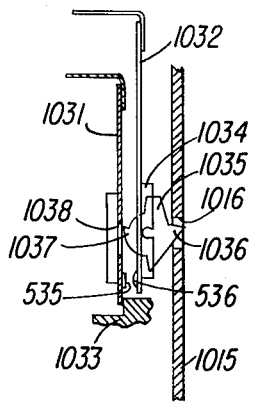
FIGS. 12, 13 and 14 are greatly enlarged fragmentary similar views of switching apparatus incorporated in the time clock controller of FIGS. 10 and 11, and illustrating three successive positions of this switching apparatus.
Figure 13:
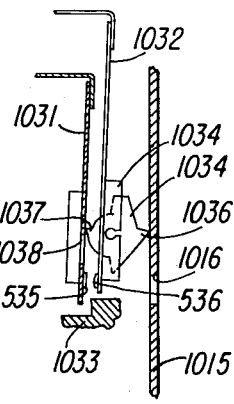
Figure 14:
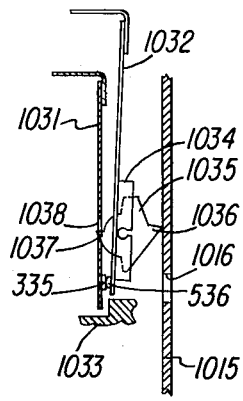

Referring now to FIGS. 12 to 14, inclusive, it will be observed that the two electric contacts 535 and 536 that are governed by the time clock controller 530 are respectively carried adjacent to the outer ends of two resilient contact springs 1031 and 1032; the contact spring 1032 is arranged immediately behind the time gear 1015; and the contact spring 1031 is arranged immediately behind the contact spring 1032. Also, the extreme outer end of the contact spring 1031 cooperates with a stop 1033, thereby to prevent the contact spring 1031 from riding with the contact spring 1032 toward the time gear 1015 beyond the stopped position thereof, as established by the stop 1033. Also, the contact spring 1032 carries an insulating block 1034 upon which there is pivotally mounted a drag-type follower 1035 that is provided with a projection 1036 that cooperates with the slot 1016 that is formed in the time gear 1015. Moreover, the follower 1035 is provided with a projection 1037 that cooperates with a slot 1038 formed in the contact spring 1031.

In FIG. 12, the time gear 1015 is shown in its stop condition; whereby the projection 1037 provided on the follower 1035 is disposed in the slot 1016 formed in the time gear 1015; whereby the resiliency of the contact spring 1032 causes the same to move toward the time gear 1015 and away from the contact spring 1031, so that the electric contacts 536 and 535 are disengaged, the stop 1033 preventing the contact spring 1031 from riding beyond its stop position with the contact spring 1032 toward the time gear 1015. Accordingly, in the stop condition of the time gear 1015, the electric contacts 535 and 536 occupy their open positions.

In FIG. 13, the time gear 1015 is shown in its time-set condition; whereby the projection 1036 carried by the follower 1035 engages the solid body of the time gear 1015, by virtue of the displacement of the time gear 1015 in the counterclockwise direction incident to the setting of the time-to-cook time interval into the mechanism. Moreover, the follower 1033 is rotated in the clockwise direction, as viewed in FIG. 13, about its own pivot, thereby causing the projection 1037 to ride out of the slot 1038 formed in the contact spring 1031, with the result that the projection 1037 engages the body of the contact spring 1031, thereby to restrain the contact spring 1031 to the left, away from the contact spring 1032, so that the electric contacts 535 and 536 are restrained into their open positions.

In FIG. 14, the gear 1015 is shown in its cook condition; whereby the time gear 1015 has been rotated slightly in the clockwise direction from its time-set condition of FIG. 13. More particularly, when the time gear 1015 is rotated slightly in the clockwise direction into the position shown in FIG. 14, the follower 1035 is rotated slightly in the counterclockwise direction about its own pivot, so that the projection 1037 rides off of the body of the contact spring 1031 into the slot 1038 provided in the contact spring 1031, with the result that the contact spring 1031 moves toward the right and toward the contact spring 1032. As a consequence of this movement of the contact spring 1031 toward the contact spring 1032, the electric contact 535 is brought into engagement with the electric contact 536; whereby the electric contacts 535 and 536 occupy their closed positions.

Still subsequently, when the time-to-cook time interval has expired, the time gear 1015 has been rotated in the clockwise direction into a position so that the slot 1016 formed therein has again registered with the projection 1036 formed on the follower 1035; whereby the projection 1036 falls in the slot 1016 provided in the time gear 1015, with the result that the contact spring 1032 is moved from its position of FIG. 14 again into its position of FIG. 12. More particularly, the contact spring 1032 moves toward the right, as shown in FIG. 14, and thus toward the time gear 1015; whereby the contact spring 1031 tends to follow the contact spring 1032, but is prevented from following, by virtue of the cooperation between the stop 1033 and the extreme outer end of the contact spring 1031. Accordingly, the contact spring 1032 moves further toward the right than does the contact spring 1031; whereby the electric contacts 536 and 535 are again moved into their open positions, as shown in FIG. 12.

The mode of operation of the time clock controller 530 to govern the electric contacts 535 and 536 will be further facilitated from the following example: First assume that the stop time control knob 533 has been set to predetermine that the desired cooking operation is to terminate at 5:00 o'clock. Specifically, the stop time control knob 533 may be rotated in either direction to the desired stop time (5:00 o'clock); whereby the gear 1013 rotates the gear 1009 causing the gear 1007 to rotate the gear 1008; whereby the latch member 1014 is rotated along with the gear 1008 and ahead of the actual clock position of the gear 1006 that is related to the actual present clock time. Thus the gear 1008 occupies an advanced position with respect to the gear 1006 that occupies a position related to the actual clock time, as noted above.

At this time, the time gear 1015 is set in accordance with the time-to-cook time interval; which setting of the time gear 1015 may be effected either by manual manipulation of the time-to-cook control knob 531 or by the insertion of a cooking control card 600, etc., into the cooking control card magazine 300, as previously explained. In either case, the time gear 1015 is displaced from its stopped condition, as shown in FIG. 12, into its time-set condition, as shown in FIG. 13, as previously described.

More specifically, the time gear 1015 is displaced in the counterclockwise direction, as viewed in FIG. 11, so that the slot 1016 formed therein moves out of alignment with the projection 1036 provided on the follower 1035; with the result that the contact springs 1031 and 1032 are actuated from the stop condition of FIG. 12 to the time-set condition of FIG. 13. Also, this rotation of the time gear 1015 in the counterclockwise direction is against clock time, with the result that the time gear 1015 occupies a position of angular displacement with respect to the gear 1008, corresponding to the preset time-to-cook time interval, this angularity corresponding to the previously assumed time-to-cook time interval; which may be assumed to be 1 hour and 15 minutes. Further, this rotation of the time gear 1015 in the counterclockwise direction, as viewed in FIG. 11, has moved the slot 1017 formed in the time gear 1015 out of engagement with the stationary spring 1018.

Now as time proceeds, the gear train 1003 rotates the gear 1006 on a clock time basis, so that the pinion 1007 acts as a planetary gear, in that it does not rotate about its own axis upon the supporting bracket 1010 carried by the gear 1009; whereby the gear 1007 rotates the gear 1008 along with the gear 1009 maintaining the originally set angle of displacement between the gears 1006 and 1008.

At the clock time of 3:45, corresponding to the angle of displacement between the gears 1006 and 1008 and also to the preset time-to-cook time interval of 1 hour and 15 minutes, the projecting latch member 1014 falls through the slot 1017 provided in the time gear 1015, thereby latching the time gear 1015 to the gear 1008, so that thereafter the time gear 1015 that has been heretofore stationary will now rotate with the gear 1008. A slight forward rotation in the clockwise direction, as viewed in FIG. 11, is now imparted to the time gear 106, thereby to cause the same to actuate the drag follower 1035, with the result that the contact springs 1031 and 1032 are actuated from their time-set condition of FIG. 13 into their cook condition of FIG. 14, in the manner previously explained.

The cooking operation is now in progress and will proceed throughout the set time-to-cook time interval of 1 hour and 15 minutes, whereupon the time gear 1006 will be advanced to such position that the slot 1016 therein will coincide with the projection 1036 carried by the follower 1035. This condition will prevail at 5:00 o'clock; whereupon the switch springs 1032 and 1033 are operated from their cook condition, as shown in FIG. 14, back into their stop condition, as shown in FIG. 12, thereby to terminate the cooking operation.

Shortly thereafter, as the time gear 1015 is rotated slightly forwardly in the clockwise direction, the slot 1017 in the time gear 1015 receives the end of the stationary spring 1018, whereby the stationary spring 1018 locks the time gear 1015 against further forward rotation, so that the further forward rotation of the gear 1008 brings about the declutching or disengagement of the latch member 1014 from the slot 1017 in the time gear 1015, with the result that the gear 1008 is no longer connected to the time gear 1015; whereby further rotation of the gear 1008 is not important or related to the stationary position of the time gear 1015. At this time, the mechanism is reset back into its normal stop position.

Again referring to FIGS. 10 and 11 and in conjunction with the construction of the time clock controller 530, it is noted that the time gear 1015 carries a forwardly projecting arbor 1041 that carries, in turn, a dial 1042, on the extreme front end thereof that is visible through the previously-mentioned window 532 that is formed in the front of the casing of the time clock controller 530. Accordingly, during the resetting of the time gear 1015 during the time interval of the cooking operation and as the time gear 1015 is returned back into its position, as shown in FIG. 12, time indicia carried by the dial 1042 are presented in the window 532; which indicia are progressively reduced as time passes. Specifically, the legend "off" is carried by the dial 1042 and ultimately appears in the window 532 when the time gear 1015 is reset into its condition as shown in FIG. 12.

Also, it is noted that the gear 1009 carries a bushing 1043 surrounding the arbor 1041 and carrying, in turn, a dial 1044, on the extreme front end thereof that is visible through the previously-mentioned window 534 that is formed in the front of the casing of the time clock controller 530. Accordingly, when the shaft 1012 sets into the mechanism a clock stop time upon the gear 1009, it also rotates the dial 1044, so that the clock time indicia carried by the dial 1044 are presented in the window 534. Specifically, the set stop clock appears in the window 534 at all times.

Recapitulating: the stop clock time is always set by the stop-time control knob 533 and remains in force until the control knob 533 is again manipulated in order to bring about the setting of another stop clock time. On the other hand, the time-to-cook time interval may be selectively set into the mechanism either by the utilization of the time-to-cook control knob 531, or by the utilization of one of the cooking control cards 600, etc. In any case, the time-to-cook time interval that is set into the mechanism is cleared therefrom after the carrying out of the preset cooking time interval, explained above. Of course, after the clearing of the preset time-to-cook time interval from the mechanism another such time-to-cook time interval may be again reset thereinto by further manipulation of the manual control knob 531 or by the reinsertion of one of the cooking control cards 600, etc., into the cooking control card magazine 300.

Again reverting to the control of the pinion 302 by the associated cooking control card 600, etc., and referring to FIGS. 10 and 11, it is noted that the shaft connecting the gears 1021 and 1022 is mounted in a slot provided in the supporting structure so that the gear 1022 may move away from the time gear 1015 and out of engagement therewith, when the time gear 1015 is returned in the clockwise direction back into its normal position. This arrangement prevents the return movement of the time gear 1015 from projecting the cooking control card 600, etc., arranged in the magazine 300 from the slot arranged in the top of the casing 301 during the return movement mentioned. On the other hand, the gear 1022 is restrained in place, so that it meshes the time gear 1015 by an associated light spring, indicated at 1045 in FIG. 11; whereby the gear 1022 retains its mesh with the time gear 1015, when the pinion 302 is rotated in the counterclockwise direction by the insertion of the cooking control card into the slot provided in the top of the casing 301, as previously explained.

Also, it is noted that the shaft 1011 is mounted for limited longitudinal sliding movement and is biased into its inwardly projected position by an associated coil spring 1046; and further, the extreme front end of the shaft 1011 carries a conical projection 1047 that is engaged by a cooking control card 600, etc., as it is inserted into the slot formed in the top of the casing 301, as previously explained, so that the mere insertion of the cooking control card 600, etc., into the magazine 300 forces the shaft 1011 forwardly so as to disengage or declutch the associated pinion 1019 carried thereby from engagement with the time gear 1015. This arrangement comprises a mechanical interlock; whereby the insertion of a cooking control card 600, etc., into the magazine 300 disables the manually operable cooking time interval control knob 531 in order that the user may not inadvertently set a time-to-cook time interval by manipulation of the manual control knob 531 following the insertion of a cooking control card 600, etc., into the magazine 300, thereby to prevent conflict between these two independently and selectively operable facilities for setting a cooking time interval into the mechanism.

SECTION 4

*The Basic Cooking Operations That May Be Carried Out in the Electric Range 100*

(1) The surface heating unit 501 may be continuously operated on a manual basis under the control of the surface unit controller 200 that is operative selectively to establish the temperature ranges corresponding to "warm," "boil" and "fry" cooking temperatures of the surface heating unit 501 and with the manual controller 540 in its "manual control" position. In this operation, the temperature of the surface unit 501 is preset by the position of the dial 202 of the surface unit controller 200 and the preset temperature is maintained by the action of the thermistor 251 in sensing the temperature of the bottom of the cooking vessel that is supported by the surface unit 501.

(2) The surface heating unit 501 may be automatically controlled on a time basis by the time clock controller 530, utilizing one of the surface control cards 700, etc., arranged in the cooking card control magazine 300. In this case, the mere insertion of the surface control card 700, etc., into the card magazine 300 disables the surface unit controller 200 to prevent an interfering setting by the surface unit controller 200. Also, the insertion of the surface control card 700, etc., into the magazine 300 automatically establishes the predetermined temperature at which the cooking operation upon the surface unit 501 is to be carried out; and further, the insertion of the surface control card 700, etc., into the magazine 300 automatically sets the time-to-cook time interval into the time clock controller 530, as previously explained. However, as previously noted, the stop clock time at which the cooking operation is to terminate is manually preset into the time clock controller 530 by manipulation of the stop time control knob 533, prior to the insertion of the surface control card 700, etc., into the magazine 300.

In passing, it is noted that the insertion of the surface control card 700, etc., into the magazine 300, without the setting of the stop clock time into the time clock controller 530 is still effective to set a time-to-cook time interval; however, the time-to-cook time interval proceeds immediately from the present clock time at which the surface control card 700, etc., is inserted into the magazine 300.

(3) An ordinary broiling cooking operation may be carried out continuously in the oven cavity 102 on a manual basis under the control of the oven controller 400 in its "broil" position; and similarly, a rotary broiling cooking operation may be carried out continuously in the oven cavity 102 on a manual basis under the control of the oven controller 400 in its "rotary-broil" position. In the case of the rotary broiling cooking operation, the rotary broil motor 550 is also operated to effect rotation of the spit supporting the roast and arranged in cooperating relation with the chuck 121 carried by the spit mechanism 110. Also, it is mentioned that the two temperatures at which the ordinary broiling operation and at which the rotary broiling operation are carried out are slightly different, the rotary broiling operation being carried out at a slightly higher temperature. However, these temperatures are automatically set by the corresponding broil resistor 491 and by the rotary broil resistor 492 that are respectively selected in the corresponding "broil" and "rotary-broil" positions of the dial 402 of the oven controller 400. Also, in each of these broiling cooking operations, the temperatures that are preset by the dial 402 of the oven controller 400 are maintained by the thermistor 451 that is arranged to sense the temperature in the oven cavity 102.

(4) A baking cooking operation may be carried out continuously in the oven cavity 102 on a manual basis under the control of the oven controller 400 in its variable bake position and with the manual controller 540 in its "manual control" position. In this case, it is noted that the variable bake position of the dial 402 of the oven controller 400, variably presets the temperature that is to be maintained in the oven cavity 102 in the corresponding temperature range 200° F. to 550° F., the preset temperature range being maintained by the thermistor 451 arranged in the oven cavity 102 in the manner explained above.

(5) A baking operation in the oven cavity 102 may be automatically carried out on a time basis by the time clock controller 530 and with the manual controller 540 in its "clock control" position, and upon a manual basis. In this case, the manual control knobs 533 and 531 are sequentially set in the time clock controller 530 and the oven controller 400 is operated into the desired temperature setting of its bake position of its dial 402, in the manner previously explained. Of course, in this case, the automatic baking operation is initiated at the start clock time preceding the stop clock time by the time-to-cook time interval, as established in the time clock controller 530, in the manner previously explained. Accordingly, in this case, the cooking time is established by the time clock controller 530, whereas the temperature of the baking cooking operation is established by the position of the dial 402 of the oven controller in its variable bake position.

(6) Also, a baking operation in the oven cavity 102 may be automatically carried out on a time basis by the time clock controller 530 (and with the manual control 540 in its "clock control" position), utilizing one of the oven control cards 600, etc., arranged in the cooking card control magazine 300. In this case, the mere insertion of the oven control card 600, etc., into the card magazine 300 disables the oven controller 400 to prevent an interfering setting by the oven controller 400. Also, the insertion of the oven control card 600, etc., into the magazine 300 automatically establishes the predetermined temperature at which the baking operation in the oven cavity 102 is to be carried out; and further, the insertion of the oven control card 600, etc., into the magazine 300 automatically sets the time-to-cook time interval into the time clock controller 530, as previously explained. However, as previously noted, the stop clock time at which the cooking operation is to terminate is manually preset into the time clock controller 530 by manipulation of the stop time control knob 533, prior to the insertion of the oven control card 600, etc., into the magazine 300.

In passing, it is noted that the insertion of the oven control card 600, etc., into the magazine 300, without the manual setting of the stop clock time clock controller 530 is still effective to set a time-to-cook time interval; however, the time-to-cook time interval proceeds immediately from the present clock time at which the oven control card 600, etc., is inserted into the magazine 300.

In conjunction with the above items 2 and 6, it is pointed out that the mere insertion of a cooking control card into the magazine 300 disables the manually operable control knob 531 in the time clock controller 530; whereby the actual time-to-cook time interval that is set into the clock controller 530 is established by the cooking control card in the magazine 300, without the possibility of a conflicting setting by the manipulation of the manual control knob 531.

Also, it is apparent that the cooking operation of item 1 may be carried out simultaneously with any one of the cooking operations of items 3, 4, 5 and 6, that the cooking operation of item 2 may be carried out simultaneously with either one of the cooking operations of items 3 and 4, and that the cooking operations of items 2, 5 and 6 are mutually exclusive with respect to each other, since each of these cooking operations utilizes the time clock controller 530.

Finally, of course, it will be appreciated that only one of the cooking control cards 600, 700, etc., may be inserted at any particular time into the cooking control card magazine 300.

SECTION 5

*Continuous Operation of the Surface Heating Unit 501 Under the Control of the Individually Associated Controller 200*

In order to carry out a continuous cooking operation involving the surface heating unit 501, the individually associated manually operable surface unit controller 200 is operated out of its "off" position into the desired temperature range involving its "warm," "boil" and "fry" positions. In the arrangement, the warm range may correspond to the temperature range 120°–220° F.; the boil range may correspond to the temperature range 220°–320° F.; and the fry range may correspond to the temperature range 320°–420° F. Accordingly, the warm, boil and fry ranges respectively correspond generally to meat-cooking, candy-making and deep-fat frying cooking operations.

Now assuming that the dial 202 is rotated from its "off" position into its "warm" position, as indicated by the cooperating index marker 203, this rotation of the operating shaft 201 effects closure of the switches 231, 232 and 234 and effects adjustment of the potentiometer 210 to a relatively high effective resistance. Of course, it is assumed that the manual controller 540 occupies its "manual control" position and that no surface cooking control card 600, etc., is disposed in the magazine 300. Closure of the switch 232 connects the line conductors 241 to the conductor 279; whereby the limiting resistor 457 limits the current conducted through the crystal rectifier 458, and the crystal rectifier 458 effects the supply of B+ potential upon the conductor 388, which potential is connected via the limiting resistor 259 to the conductor 273 and thence to the anode of the triode section 254, for a purpose more fully explained below. Also, the supply of power to the conductor 279 effects energization of the primary winding 356 of the transformer 355; whereby the voltage induced in the secondary winding 357 thereof is impressed between the conductors 283 and 286 and thence directly to the input terminals of the surface unit bridge 250. At this time, the adjusted potentiometer 210 is connected between the conductors 285 and 286; the conductor 286 is connected directly to one of the input terminals of the bridge 250; and the conductor 285 is connected via the closed switch springs 322 and 323 to the conductor 272 and thence to one of the output terminals of the bridge 250, the other output terminal of the bridge 250 being connected directly to the grounded neutral conductor 243.

At this time, it is assumed that a cooking vessel containing a food to be cooked is supported upon the cooking platform defined by the upper surface of the surface heating unit 501, that the bottom of the cooking vessel is cold, and that accordingly, the thermistor 251 arranged in contact with the bottom of the cooking vessel mentioned senses the cold temperature. Hence, the resistance of the thermistor 251 is exceedingly high, with the result that the bridge 250 is severely unbalanced, thereby applying via the conductor 272 a large bias to the grid of the triode section 254, with the result that the triode section 254 is rendered nonconductive; whereby the bias applied via the capacitor 262 to the conductor 274 and thence to the control grid of the tetrode section 255 is small rendering the tetrode section 255 conductive. Accordingly, the relay 270 is energized, the circuit extending from the line conductor 241 via the closed switch 231, the conductor 280, the switch springs 348 and 349, the conductor 276 and the winding of the relay 270 to the conductor 275 extending the anode of the tetrode section 255, the cathode of the tetrode section 255 being connected to the grounded neutral conductor 243. Thus, the relay 270 operates closing its contacts 271; whereby the grounded neutral conductor 243 is connected to the conductor 277, with the result that the contactor 505 operates. Upon operating, the contactor 505 completes at its contact bridging member 506 and its front contacts a circuit including the conductor 502 for bridging the surface heating unit 501 across the conductors 278 and 279. The conductor 279 is connected to the line conductor 241 via the closed switch 232; while the conductor 278 is connected to the line conductor 242 via the closed switch 244. Hence, the surface heating unit 501 is energized across the line conductors 241 and 242 at 236 volts, with the result that the temperature thereof rapidly rises effecting corresponding heating of the bottom of the supported cooking vessel, whereby the temperature of the thermistor 251 increases. More specifically, the resistance of the thermistor 251 decreases in proportion to the increase in the temperature thereof, resulting from the sensing of the temperature of the bottom of the cooking vessel supported by the platform provided by the surface heating unit 501. As the resistance of the thermistor 251 decreases, the balance of the bridge 250 is improved, with the result that the bias applied therefrom to the conductor 272 and thence to the control grid of the triode section 254 is reduced. Ultimately, when the temperature sensed by the thermistor 251 matches that set by the adjusted position of the potentiometer 210, the bridge 250 is substantially balanced; whereby the bias applied to the conductor 272 and thence to the control grid of the triode section 254 is substantially removed; whereby the triode section 254 is rendered conductive, with the result that the bias applied via the conductor 273 and the capacitor 262 is increased; whereby this bias applied via the conductor 274 to the control grid of the tetrode section 255 drives the tetrode section 255 substantially to cut-off, with the result that the current traversing the winding of the relay 270 is reduced effectively to bring about the restoration of the relay 270. Upon restoring, the relay 270 opens its contacts 271, thereby deenergizing the winding of the contactor 505, with the result that the contactor 505 restores. Upon restoring, the contactor 505 interrupts at its contact bridging member 506 and its front contacts the previously traced circuit for energizing the surface heating unit 501, with the result that further heating thereof at this time is arrested so that the temperature of the cooking vessel supported by the surface heating unit 501 subsides, with the result that the temperature of the thermistor 251 is decreased so that the resistance thereof is increased, thereby bringing about the application of an increased bias applied from the bridge 250 via the conductor 272 to the control grid of the triode section 254. As the temperature of the cooking vessel mentioned subsides adequately, the resistance of the thermistor 251 increases adequately, so that the bias applied from the bridge 250 to the control grid of the triode section 254 drives the triode section 254 substantially toward cut-off, thereby reducing the bias applied via the conductor 273 to the control grid of the tetrode section 255, with the result that the tetrode section 255 becomes conductive; whereby the winding of the relay 270 is re-energized causing the same to operate in order to bring about reoperation of the contactor 505, in the manner previously explained. Upon reoperating, the contactor 505 recompletes the previously traced circuit for energizing the surface heating unit 501, thereby again to increase the temperature of the cooking vessel supported by the platform provided by the surface heating unit 501.

Accordingly, the thermistor 251 sensing the temperature of the bottom of the cooking vessel supported by the platform provided by the surface heating unit 501 cooperates with the adjusted position of the potentiometer 210 in order variably to maintain the balance of the bridge 250, with the result that the amplifier sections 254 and 255 are controlled so as selectively to operate and restore the relay 270, with the result that the contactor 505 is selectively operated and restored in order selectively to complete and to interrupt the circuit for energizing the surface heating unit 501. Accordingly, the supply of heat energy to the surface heating unit 501 is modulated to maintain substantially the temperature of the bottom of the supported cooking vessel mentioned at that preset by the potentiometer 210 as a result of the setting of the dial 202 in its "warm" position in cooperation with the associated index marker 203.

Now assuming that the dial 202 is rotated from its "off" position into its "fry" position, as indicated by the cooperating index marker 203, this rotation of the operating shaft 201 also effects closure of the switches 231, 232 and 234 and effects adjustment of the potentiometer 210 to a relatively low effective resistance. The subsequent operation of the control network is substantially identical to that described above, except that the potentiometer 210 is adjusted to a relatively low effective resistance; whereby the temperature of the thermistor 251 must be elevated to a relatively high temperature in order to bring about a balance of the bridge 250. Accordingly, in this case, the bridge 250 is balanced at a relatively high temperature of the thermistor 251, thereby effecting the restoration of the relay 270 and the contactor 505, with the resulting deenergization of the surface heating unit 501, in the manner explained above. Of course, the bridge 250 is alternately balanced and unbalanced controlling the relay 270 and the consequent control of the contactor 505, so that the surface heating unit 501 is alternately deenergized and energized for the purpose of maintaining the temperature of the bottom of the heating vessel supported by the surface heating unit 501 substantially at the particular adjusted fry cooking temperature set by the dial 202 in its "fry" position at this time; all in the manner previously explained.

Now assuming that the dial 202 is rotated from its "off" position into its "boil" position, as indicated by the cooperating index marker 203, this rotation of the operating shaft 201 effects closure of the switches 231, 232, 233 and 234 and effects adjustment of the potentiometer 210 to a relatively medium effective resistance. The subsequent operation of the control network is substantially identical to that described above, except that the potentiometer is adjusted to a relatively medium effective resistance, and except that the control device 510 is also encircuited into the control circuit. Hence the temperature of the thermistor 251 must be elevated to a relatively medium temperature in order to bring about a balance of the bridge 250. Accordingly, in this case, the bridge 250 is balanced at a relatively medium temperature of the thermistor 251, thereby effecting the restoration of the relay 270 and the contactor 505 in the manner previously explained. However, in this special case, upon restoring, the contactor 505 completes at its contact bridging member 506 and its back contacts an alternative circuit for energizing the surface heating unit 501; which circuit extends from the line conductor 242 via the closed switch 234 and the conductor 278 to one terminal of the surface heating unit 501, and extends from the line conductor 241 via the closed switch 232, the conductor 279, the resistor 512, the thermostatic element 511, the contact 513, the conductor 282, the closed switch 233, the conductor 281, the contact bridging member 506 and its closed back contacts and the conductor 502 to the other terminal of the surface heating unit 501. Accordingly, at this time, the surface heating unit 501 is energized in series circuit relation with the resistor 512 across the line conductors 241 and 242 at 236 volts. Of course, the series position of the resistor 512 effects a reduced heating effect in the surface heating unit 501; and moreover, the resistor 512 is heated, thereby to effect heating of the thermal element 511 in the control device 510. When the temperature of the thermal element 511 reaches a predetermined temperature, it moves away from the contact 513, thereby interrupting the above traced auxiliary circuit for energizing in series relation the resistor 512 and the surface heating unit 501. The thermostatic element 511 then cools and again moves toward the contact 513 reclosing the above traced auxiliary circuit for energizing the resistor 512 in series relation with the surface heating unit 501.

Accordingly, in this case, it will be understood that when the temperature of the cooking vessel that is sensed by the thermistor 251 is substantially lower than the medium temperature preset by the dial 202 in its "boil" position, the bridge 250 is substantially out-of-balance effecting operation of the relay 270 and the consequent operation of the contactor 505 so that the primary circuit for energizing the surface heating unit 501 is completed. On the other hand, when the temperature of the cooking vessel that is sensed by the thermistor 251 is substantially at the medium temperature preset by the dial 202 in its "boil" position, the bridge 250 is substantially balanced, with the result that the relay 270 is restored causing the contactor 505 to be retained in its restored position. When the contactor 505 occupies its restored position, the auxiliary circuit for energizing the surface heating unit 501 is completed intermittently as the control device 510 effects alternate engagement and disengagement of the thermal element 511 with respect to the associated contact 513. This intermittent operation of the control device 510 is effective to maintain a rolling boil of the contents of the cooking vessel supported by the platform provided by the surface heating unit 501 after the medium temperature preset by the dial 202 has been reached, as explained above.

Each of the foregoing cooking operations involving the surface heating unit 501 proceeds on a continuous basis until the manual dial 202 is operated back into its "off" position; whereby all of the switches 231, 232, 233 and 234 are returned into their normal open positions so as to restore the circuit network into its normal condition.

SECTION 6

*Automatic Operation of the Surface Heating Unit 501 Under the Joint Control of the Cooking Card Control Magazine 300 and of the Time Clock Controller 530*

In order to carry out a cooking operation involving the surface heating unit 501 under the joint control of the cooking card control magazine 300 and of the time clock controller 530, it is first necessary for the cook to determine when the desired surface cooking operation is to terminate and correspondingly to set the selected stop time into the time clock controller 530 by manipulation of the manually operable "stop-time" control knob 533. Then the cook selects the surface unit control card corresponding to the desired cooking operation and then inserts the same into the card slot provided in the top of the cooking control card magazine 300. For example, the cook may determine that the cooking operation is to terminate at 5:00 o'clock; whereby the manually operable control knob 533 is correspondingly manipulated to set this selective stop clock time into the time clock controller 530, in the manner previously explained in Section 3. Also, the cook may select the basic surface unit cooking control card 700 of FIG. 7; whereby the same is inserted into the card slot provided in the top of the casing 301 of the magazine 300. The cooking control card 700 is pushed downwardly into its home position in the casing 301 as established by the engagements of the shoulders 703 provided on the opposite side edges of the card 700 and the abutments provided at the opposite sides of the casing 301. This insertion of the card 700 into the magazine 300 causes the rack 702 provided in the right-hand side edge of the card 700 to cooperate with the pinion 302 provided in the magazine 300 so as to set a corresponding cooking time interval into the time clock controller 530, in the manner previously explained in Section 3. For example, it may be assumed that the insertion of the card 700 into the magazine 300 effects the setting of a cooking time interval of 1 hour and 15 minutes; whereby in this case, the mechanism incorporated in the time clock controller 530 is preset so as to close the contacts 535 and 536 at the clock time of 3:45, thereby establishing the cooking time interval of 1 hour and 15 minutes. Moreover, it is assumed that the present clock time of the clock proper 538 is at some time preceding the start clock time of 3:45.

Furthermore, when the card 700 is inserted into the magazine 300, the rectangular slots or apertures 712, 718 and 721 respectively cooperate with the feelers 312, 318 and 321 incorporated in the magazine 300, and specifically this cooperation is such that when the card 700 occupies its home position in the magazine 300, the corresponding feelers 312, 318 and 321 are not actuated away from their normal positions, as illustrated in FIG. 3, since the apertures 712, 718 and 721 in the card 700 constitute cut-outs therein. On the other hand, the solid portions of the card 700 actuate the remainder of the feelers 311, 313, 314, 315, 316, 317, 319 and 320 incorporated in the magazine 300 to effect corresponding switching operations therein in the circuit network. More particularly, at this time, when the card 700 is inserted into the magazine 300, the various sets of switch springs incorporated in the magazine 300 occupy the following positions:

| Switch springs: | Condition |
|---|---|
| 323—322 | O (open) |
| 323—324 | X (closed) |
| 325—326 | X |
| 328—327 | X |
| 328—329 | O |
| 330—331 | O |
| 332—333 | X |
| 335—334 | O |
| 337—336 | O |
| 339—338 | O |
| 340—341 | X |
| 343—342 | X |
| 343—344 | O |
| 346—345 | O |
| 346—347 | X |
| 349—348 | O |
| 349—350 | X |
| 352—351 | X |
| 352—353 | O |

Closure of the switch springs 332—333 connects the line conductor 241 to the conductor 279, thereby to energize the primary winding 356 of the transformer 355, so as to condition the bridge 250 for subsequent operation. Also, the connection of power to the conductor 279 renders the crystal rectifier 458 operative to supply B+ potential to the conductor 388 extending to the anode of the triode section 254. Closure of the switch springs 323—324 connects the conductor 272 to the conductor 375; while the combination of the opening of the switch springs 335—334, the opening of the switch springs 337—336, the opening of the switch springs 339—338 and the closing of the switch springs 340—341 connects the conductor 375 via the resistor 374 to the conductor 389; while the closure of the switch springs 346—347 connects the conductor 389 to the conductor 286. Accordingly, at this time, the conductors 272 and 286 that extend to the input terminals of the bridge 250 are connected together via the resistor 374; whereby this arrangement presets the temperature that the thermistor 251 must subsequently match in the subsequent operation of the bridge 250. Also in passing, it is mentioned that the opening of the switch springs 323—322 disables the potentiometer 210 so as to prevent the connection thereof across the input terminals of the bridge 250.

In view of the foregoing, it will be appreciated that the insertion of the surface unit control card 700 into the magazine 300 not only registers the cooking time interval into the time clock controller 530, but also presets the temperature that is subsequently to be maintained at the bottom of the cooking vessel, as sensed by the thermistor 251, this presetting of the temperature mentioned being enforced by the connection, in the present example, of the resistor 374 across the conductors 272 and 286 extending to the input terminals of the bridge 250, as previously explained.

Continuing now with the cooking operation, it is again assumed that a cooking vessel containing a food to be cooked is supported upon the cooking platform defined by the upper surface of the surface heating unit 501, that the bottom of the cooking vessel is cold, and that, accordingly, the thermistor 251 arranged in contact with the bottom of the cooking vessel mentioned senses the cold temperature. Thereafter, when the clock-time of 3:45 arrives, the time clock controller 530 operates to effect engagement of the contacts 535 and 536 in the manner previously explained; whereby the line conductor 241 is connected to the conductor 382 and therefrom via the closed switch springs 350—349 to the conductor 276 extending to one terminal of the winding of the relay 270. At this time, since the thermistor 251 is cold, the resistance thereof is exceedingly high, with the result that the bridge 250 is severely unbalanced, thereby applying via the conductor 272 a large bias to the grid of the triode section 254, with the result that the triode section 254 is rendered non-conductive; whereby the bias applied via the capacitor 262 to the conductor 274 and thence to the control grid of the tetrode section 255 is small rendering the tetrode section 255 conductive. Accordingly, the relay 270 is energized via the tetrode section 255, with the result that it operates. Upon operating, the relay 270 closes its contacts 271 completing a circuit for energizing the winding of the contactor 505. The last-mentioned circuit extends from the grounded neutral conductor 243 via the closed contacts 271, the conductor 277, the winding of the contactor 505, the conductor 279 and the closed switch springs 333—332 to the line conductor 241. Accordingly, the contactor 505 operates connecting at its contact bridging member 506 and its front contacts the surface heating unit 501 across the conductors 279 and 278. At this time, the conductor 279 is connected via the previously traced circuit to the line conductor 241 and the conductor 278 is connected via the closed switch springs 325—326 to the line conductor 242; whereby the surface heating unit 501 is energized across the supply conductors 241 and 242 at 236 volts, with the result that the temperature thereof rapidly rises effecting the corresponding heating of the bottom of the supported cooking vessel; whereby the temperature of the thermistor 251 increases. More specifically, the resistance of the thermistor 251 decreases in proportion to the increase in the temperature thereof, as previously explained. As the resistance of the thermistor 251 decreases, the balance of the bridge 250 is improved, with the result that the bias supplied therefrom to the conductor 272 and thence to the control grid of the triode section 254 is reduced. When the temperature sensed by the thermistor 251 matches that set by the cooking control card 700 in the magazine 300 (the resistance of the thermistor 251 substantially matching that of the resistor 374), the bridge 250 is substantially balanced; whereby the bias applied to the conductor 272 and thence to the control grid of the triode section 254 is substantially removed; whereby the triode section 254 is rendered conductive, with the result that the bias applied via the conductor 273 and the capacitor 272 is increased; whereby this bias applied via the conductor 274 to the control grid of the tetrode section 255 drives the tetrode section 255 substantially to cut-off, with the result that the current traversing the winding of the relay 270 is reduced effectively to bring about the restoration of the relay 270. Upon restoring, the relay 270 opens its contacts 271 bringing about the restoration of the contactor 505 and the consequent deenergization of the surface heating unit 501, all in the manner previously explained in Section 5. Thereafter the temperature of the thermistor 251 subsides, with the result that the resistance thereof is increased in order again to bring about a resistance mismatch with the resistor 374 and the resulting unbalancing of the bridge 250; whereby the relay 270 is reoperated effecting reoperation of the contactor 505 and the resulting re-energization of the surface heating unit 501; all in the manner previously explained in Section 5.

Accordingly, the thermistor 251 senses the temperature of the bottom of the cooking vessel supported by the platform provided by the surface heating unit 501 and cooperates with the resistance of the preselected resistor 374 in order variably to maintain the balance of the bridge 250, with the result that the amplifier sections 254 and 255 are controlled, so as selectively to operate and to restore the relay 270, with the result that the contactor 505 is selectively operated and restored in order selectively to complete and to interrupt the circuit for energizing the surface heating unit 501. Accordingly, the supply of heat energy to the surface heating unit 501 is modulated to maintain substantially the temperature of the bottom of the supported cooking vessel mentioned at that preset by the surface unit cooking control card 700 in its inserted position in the magazine 300.

The cooking operation continues, as explained above, and subsequently when the clock-time of 5:00 o'clock arrives, the time clock controller 530 operates the contacts 535 and 536 into disengagement, in the manner previously explained in Section 3; whereby power is removed from the conductor 382 and consequently from the conductor 276, thereby to insure the restoration of the relay 270 and the consequent restoration of the contactor 505, with the result that the surface heating unit 501 is deenergized. Accordingly, at this time, the cooking operation involving the surface heating unit 501 is terminated.

Further, it will be understood that the cooking operation described proceeded under the control of the time clock controller 530 for the preset time interval of 1 hour and 15 minutes; and moreover, the temperature of the bottom of the cooking vessel supported by the surface heating unit 501 was maintained at the temperature preset by the preselection of the resistor 374 as a consequence of the placing of the particular surface unit cooking control card 700 into the magazine 300, as previously explained. In order to restore the control of the surface heating unit 501 to the manually operable surface unit controller 200, it is only necessary for the cook to remove the card 700 from the magazine 300; whereby at this time, the feelers 311 to 321, inclusive, incorporated in the magazine 300 are returned into their normal positions effecting the return of the switch springs 322 to 353, inclusive, back into their normal positions, as illustrated in FIG. 3.

SECTION 7

*A Continuous Baking Operation in the Oven Cavity 102 Under the Control of the Individually Associated Oven Controller 400*

In order to carry out a continuous baking operation in the oven cavity 102, the individually associated manually operable oven controller 400 is operated out of its "off" position into the desired temperature range in its "bake" position. In the arrangement, the bake range may correspond to the temperature range 200°–550° F.

Now assuming that the dial 402 is rotated from its "off" position into its "bake" position, as indicated by the cooperating index marker 403, this rotation of the operating shaft 401 effects closure of the switches 431, 432, 435, 436 and 437 and effects adjustment of the potentiometer 410 to a corresponding effective resistance. Of course, it is assumed that no cooking control card 600, etc., is disposed in the magazine 300; and it is further assumed that the manually operable controller 540 occupies its "manual-control" position. Closure of the switch 432 connects the line conductor 241 to the conductor 279; whereby the limiting resistor 457 limits the current conducted through the crystal rectifier 458, and the crystal rectifier 458 effects the supply of B+ potential upon the conductor 388, which potential is connected via the limiting resistor 459 to the conductor 473, and thence to the anode of the triode section 454, for a purpose more fully explained below. Also, the supply of power to the conductor 279 effects energization of the primary winding 361 of the transformer 360; whereby the voltage induced in the secondary winding 362 thereof is impressed between the conductors 381 and 387 and thence directly to the input terminals of the oven bridge 450. At this time, the adjusted potentiometer 410 is connected between the conductors 485 and 486; the conductor 486 is connected via the closed switch 436 to the conductor 381 and thence to one of the input terminals of the bridge 450; and the conductor 485 is connected via the closed switch springs 327—328 to the conductor 472 and thence to one of the output terminals of the bridge 450, the other output terminal of the bridge 450 being connected directly to the grounded neutral conductor 243.

At this time, it is assumed that the food to be baked is suitably supported in the oven cavity 102 with the door 120 in its closed position, that the oven cavity 102 is cold, and that accordingly, the thermistor 451 arranged in heat exchange relation with the oven cavity 102 senses the cold temperature. Hence, the resistance of the thermistor 451 is exceedingly high, with the result that the bridge 450 is severely unbalanced, thereby applying via the conductor 472 a large bias to the control grid of the triode section 454, with the result that the triode section 454 is rendered non-conductive; whereby the bias applied via the capacitor 462 to the conductor 474 and thence to the control grid of the tetrode section 455 is small rendering the tetrode section 455 conductive. Accordingly, the relay 470 is energized, the circuit extending from the line conductor 241 via the closed switch 437, the conductor 494, the closed switch springs 549—548, the conductor 383, the closed switch springs 351—352, the conductor 384 and the winding of the relay 470 to the conductor 475 extending to the anode of the tetrode section 455, the cathode of the tetrode section 455 being connected to the grounded neutral conductor 243. Thus the relay 470 operates closing its contacts 471; whereby the grounded neutral conductor 243 is connected to the conductor 385, with the result that the contactor 520 operates. Upon operating, the contactor 520 completes at its contact bridging member 521 and its front contacts, a circuit including the conductor 503 for bridging the bake unit 516 across the conductors 279 and 377. Also the contactor 520 completes at its contact bridging member 522 and its front contacts, a circuit including the conductor 504 for bridging the broil unit 515 across the conductors 279 and 380. The conductor 279 is connected to the line conductor 241 via the closed switch 432; the conductor 377 is connected to the line conductor 242 via the closed switch 435; and the conductor 380 is connected to the grounded neutral conductor 243 via the closed switch 431. Hence the bake unit 516 is energized across the line conductors 241 and 242 at 236 volts, while the broil unit 515 is energized across the line conductor 241 and the grounded neutral conductor 243 at 118 volts. Thus, in the baking operation, substantially more heat is generated in the lower portion of the oven cavity 102 by the bake unit 516 than is generated in the upper portion of the oven cavity 102 by the broil unit 515. Accordingly, the temperature in the oven cavity 102 rises rapidly, whereby the temperature of the thermistor 451 increases. More specifically, the resistance of the thermistor 451 decreases in proportion to the increase in the temperature thereof, resulting from the sensing of the temperature in the oven cavity 102. As the resistance of the thermistor 451 decreases, the balance of the bridge 450 is improved, with the result that the bias applied therefrom to the conductor 472 and thence to the control grid of the triode section 454 is reduced. Ultimately, when the temperature sensed by the thermistor 451 matches that set by the adjusted position of the potentiometer 410, the bridge 450 is substantially balanced; whereby the bias applied to the conductor 472 and thence to the control grid of the triode section 454 is substantially removed; whereby the triode section 454 is rendered conductive, with the result that the bias applied via the conductor 473 and the capacitor 462 is increased; whereby this bias applied via the conductor 474 to the control grid of the tetrode section 455 drives the tetrode section 455 substantially to cut-off, with the result that the current traversing the winding of the relay 470 is reduced effectively to bring about the restoration of the relay 470. Upon restoring, the relay 470 opens its contacts 471 thereby deenergizing the winding of the contactor 520, with the result that the contactor 520 restores. Upon restoring, the contactor 520 interrupts at its contact bridging members 521 and 522 and the associated front contacts thereof, the previously traced circuits for respectively energizing the bake unit 516 and the broil unit 515, with the result that further heating thereof at this time is arrested, so that the temperature of the oven cavity 102 subsides, with the result that the temperature of the thermistor 451 is decreased, so that the resistance thereof is increased, thereby bringing about the application of an increased bias applied from the bridge 450 via the conductor 472 to the control grid of the triode section 454. When the temperature of the oven cavity 102 subsides adequately, the resistance of the thermistor 451 increases adequately, so that the bias applied from the bridge 450 to the control grid of the triode section 454 drives the triode section 454 substantially toward cut-off, thereby reducing the bias applied via the conductor 473 to the control grid of the tetrode section 455, with the result that the tetrode section 455 becomes conductive; whereby the winding of the relay 470 is again re-energized causing the same to operate in order to bring about re-operation of the contactor 520, in the manner previously explained. Upon reoperating the contactor 520 recompletes the previously traced circuits for energizing the bake unit 516 and the broil unit 515, thereby again to increase the temperature in the oven cavity 102.

Accordingly, the thermistor 451 sensing the temperature in the oven cavity 102 and cooperates with the adjusted position of the potentiometer 410 in order variably to maintain the balance of the bridge 450, with the result that the amplifier sections 454 and 455 are controlled so as selectively to operate and to restore the relay 470, with the result that the contactor 520 is selectively operated and restored in order selectively to complete and to interrupt the circuits for energizing the heating units 516 and 515. Accordingly, the supply of heat energy to the heating units 516 and 515 is modulated to maintain substantially the temperature in the oven cavity 102 at that preset by the potentiometer 410 as a result of the setting of the dial 402 in its "bake" position in cooperation with the associated index marker 403.

The foregoing cooking operation involving the heating units 516 and 515 in the oven cavity 102 proceeds on a continuous basis until the manual dial 402 is operated back into its "off" position; whereby all of the switches 431 to 439, inclusive, are returned to their normal open positions so as to restore the circuit network into its normal condition.

SECTION 8

*A Time Controlled Baking Operation in the Oven Cavity 102 Under the Joint Control of the Individually Associated Oven Controller 400 and the Time Clock Controller 530*

In order to carry out a baking operation in the oven cavity 102 under the joint control of the individually associated oven controller 400 and the time clock controller 530, it is first necessary for the cook to determine when the desired baking operation is to terminate and correspondingly to set the selected stop-time into the time clock controller 530 by manipulation of the manually operable "stop-time" control knob 530. Also, it is necessary for the cook to determine the baking time interval of the baking operation and correspondingly to set the selected start-time into the time clock controller 530 by manipulation of the manually operable "time-to-cook" control knob 531. Again, it is assumed that the cook desires the baking operation to terminate at 5:00 o'clock and to occupy a time interval of 1 hour and 15 minutes; whereby the start clock time is accordingly 3:45. The settings of the stop-clock time and start-clock time into the time clock controller 530 have been described in detail heretofore in Section 3. Of course, it is assumed that no oven cooking control card 600, etc., is disposed in the magazine 300. Also, at this time, the cook operates the dial 542 of the manually operable controller 540 into its "clock-control" position, as indicated by the cooperating index marker 543. Further, the cook operates the oven controller 400 from its "off" position into its "bake" position; and specifically, the dial 402 is operated to set the desired temperature of the baking operation in cooperation with the index marker 403 so as correspondingly to adjust the potentiometer 410; all in the manner explained in Section 7. Finally, it is assumed that the present clock time of the clock proper 538 is at some time preceding the start-clock time of 3:45; and that the cook has placed the food to be baked into the oven cavity 102 and moved the door 120 into its closed position. Operation of the oven controller 400 into its "bake" position effects the closure of the switches 431, 432, 435, 436 and 437, in the manner previously explained. However, the baking operation does not proceed immediately by virtue of the fact that the manually operable controller 540 occupies its "clock-control" position, placing the carrying out of the baking operation under the time control of the time clock controller 530. More particularly, closure of the switch 437 to connect the line conductor 241 to the conductor 494 is without effect at this time, by virtue of the fact that the switch spring 549 terminating the conductor 494 disengages the switch spring 548 terminating the conductor 383 with the manually operable controller 540 in its "clock-control" position.

Accordingly, in the present example, the carrying out of the baking operation is delayed until the clock time of 3:45 arrives; whereby the time clock controller 530 closes the contacts 535 and 536 with the result that the line conductor 241 is connected to the conductor 382 that is terminated by the switch spring 546 that engages the switch spring 547 with the manually operable controller 540 in its "clock-control" position. Accordingly, the closure of the contacts 535 and 536 at the start-clock time connects the line conductor 241 via the above traced path to the conductor 383, which conductor is connected via the closed switch springs 351—352 to the conductor 384 that extends to one terminal of the relay 470. Accordingly, at this time, the relay 470 is operated, it being assumed that the bridge 450 is unbalanced by virtue of the fact that the resistance of the thermistor 451 mismatches the resistance of the adjusted potentiometer 410, the thermistor 451 being cold at this time. Hence, the relay 470 operates effecting operation of the contactor 520 and the consequent energization of the bake unit 516 and the broil unit 515 in the oven cavity 102, all in a manner previously explained in Section 7. Of course, the thermistor 451 cooperates with the adjusted position of the potentiometer 410 selectively to control the balance of the bridge 450 and consequently the positions of the relay 470 and the contactor 520 for the purpose of maintaining the preset temperature in the oven cavity 102 as established by the adjustment of the potentiometer 410 with the oven controller 400 in its bake position, all in the manner explained in Section 7.

The baking operation continues until 5:00 o'clock, whereupon the time clock controller 530 operates the contacts 535 and 536 into disengagement, thereby to remove the application of power from the conductor 382, with the result that the relay 470 is retained in its restored position, retaining the contactor 520 in its restored position so that the bake unit 516 and the broil unit 515 are deenergized. At this time, the baking operation is thus terminated at the stop-clock time of 5:00 o'clock. At the conclusion of the baking operation, the cook normally restores the oven controller 400 from its "bake" position back into its "off" position; whereby all of the switches 431 to 439, inclusive, are restored into their open positions. Also at this time, it is normal for the cook to restore the manually operable controller 540 from its "clock-control" position back into its "manual-control" position.

SECTION 9

*An Automatic Baking Operation in the Oven Cavity 102 Under the Joint Control of the Cooking Card Control Magazine 300 and the Time Clock Controller 530*

In order to carry out a baking operation in the oven cavity 102 under the joint control of the cooking card control magazine 300 and the time clock controller 530, it is first necessary for the cook to determine when the desired baking operation is to terminate and correspondingly to set the selected stop-time into the time clock controller 530 by manipulation of the manually operable "stop-time" control knob 533. Then the cook selects the oven cooking control card corresponding to the desired baking operation and inserts the same into the card slot provided in the top of the cooking control card magazine 300. For example, the cook may determine that the baking operation is to terminate at 5:00 o'clock; whereby the manually operable control knob 533 is correspondingly manipulated to set this selected stop clock time into the time clock controller 530, in the manner previously explained in Section 3. Also, the cook may select the basic oven cooking control card 600 of FIG. 6; whereby the same is inserted into the card slot provided in the top of the casing 301 of the magazine 300. The cooking control card 600 is pushed downwardly into its home position in the casing 301 as established by the engagements of the shoulders 603 provided on the opposite side edges of the card 600 and the abutments provided in the opposite sides of the casing 301. This insertion of the card 600 into the magazine 300 causes the rack 602 provided in the right-hand side edge of the card 600 to cooperate with the pinion 302 provided in the magazine 300 so as to set a corresponding cooking time interval into the time clock controller 530, in the manner previously explained in Section 3. For example, it may be assumed that the insertion of the card 600 into the magazine 300 effects the setting of a cooking time interval of 1 hour and 15 minutes; whereby in this case, the mechanism incorporated in the time clock controller 530 is preset so as to close the contacts 535 and 536 at the clock time of 3:45, thereby establishing the cooking time interval of 1 hour and 15 minutes. Moreover, it is assumed that the present clock time of the clock proper 538 is at some time preceding the start clock time of 3:45.

Furthermore, when the card 600 is inserted into the magazine 300, the circular slots or apertures 611, 616, 619 and 620 respectively cooperate with the feelers 311, 316, 319 and 320 incorporated in the magazine 300; and specifically this cooperation is such that when the card 600 occupies its home position in the magazine 300, the corresponding feelers 311, 316, 319 and 320 are not actuated away from their normal positions, as illustrated in FIG. 3, since the apertures 611, 616, 619 and 620 in the card 600 constitute cut-outs therein. On the other hand, the solid portions of the card 600 actuate the remainder of the feelers 312, 313, 314, 315, 317, 318 and 321 incorporated in the magazine 300 to effect corresponding switching operations therein in the circuit network. More particularly, at this time, when the card 600 is inserted into the magazine 300, the various sets of switch springs incorporated in the magazine 300 occupy the following positions:

| Switch springs: | Condition |
|---|---|
| 323—322 | X (closed) |
| 323—324 | O (open) |
| 325—326 | O |
| 328—327 | O |
| 328—329 | X |
| 330—331 | X |
| 332—333 | X |
| 335—334 | O |
| 337—336 | O |
| 339—338 | X |
| 340—341 | X |
| 343—342 | O |
| 343—344 | X |
| 346—345 | X |
| 346—347 | O |
| 349—348 | X |
| 349—350 | O |
| 352—351 | O |
| 352—353 | X |

Closure of the switch springs 332—333 connects the line conductor 241 to the conductor 279, thereby to energize the primary winding 361 of the transformer 360 so as to condition the bridge 450 for subsequent operation. Also, the connection of power to the conductor 279 renders the crystal rectifier 458 operative to supply B+ potential to the conductor 388 extending to the anode of the triode section 454. Closure of the switch springs 328—329 connects the conductor 472 to the conductor 375; while the combination of the opening of the switch springs 335—334, the opening of the switch springs 337—336, the closing of the switch springs 339—338 and the closing of the switch springs 340—341 connects the conductor via the resistors 373 and 374 in parallel relation to the conductor 389; while the closure of switch springs 346—345 connects the conductor 389 to the conductor 381. Accordingly, at this time, the conductors 472 and 381 that extend to the input terminals of the bridge 450 are connected together via the resistors 373 and 374 in parallel relation; whereby this arrangement presets the temperature that the thermistor 451 must subsequently match the subsequent operation of the bridge 450. Also, in passing, it is mentioned that the opening of the switch springs 328—327 disables the potentiometer 410 so as to prevent the connection thereof across the input terminals of the bridge 450.

In view of the foregoing, it will be appreciated that the insertion of the oven control card 600 into the magazine 300, not only registers the cooking time interval into the time clock controller 530, but also presets the temperature that is subsequently to be maintained in the oven cavity 102, as sensed by the thermistor 451, this presetting of the temperature mentioned being enforced by the connecton, in the present example, of the resistors 373 and 374 in parallel relation across the conductors 472 and 381 extending to the input terminals of the bridge 450, as previously explained.

Continuing now with the baking operation, it is assumed that the food to be baked is suitably supported in the oven cavity 102 with the door 120 in its closed position, that the oven cavity 102 is cold, and that accordingly, the thermistor 451 arranged in heat-exchange relation with the oven cavity 102 senses the cold temperature. Thereafter, when the clock time of 3:45 arrives, the time clock controller 530 operates to effect engagement of the contacts 535 and 536 in the manner previously explained, with the result that the line conductor 241 is connected to the conductor 382 that is terminated by the switch spring 353 that engages the switch spring 352 terminating the conductor 384 that extends to one terminal of the relay 470. Accordingly, at this time, the relay 470 is operated, it being assumed that the bridge 450 is unbalanced by virtue of the fact that the resistance of the thermistor 451 mismatches the composite resistance of the resistors 373 and 374 connected in parallel relation to the conductors 472 and 381 and thence to the bridge 450, the thermistor 451 being cold at this time. Hence, the relay 470 operates effecting operation of the contactor 520 and the consequent energization of the bake unit 516 and the broil unit 515 in the oven cavity 102, all in a manner previously explained in Section 7. Of course, the thermistor 451 cooperates with the composite resistance of the parallel connected resistors 373 and 374 selectively to control the balance of the bridge 450 and consequently the positions of the relay 470 and the contactor 520, for the purpose of maintaining the preset temperature in the oven cavity 102 as established by the composite resistance of the parallel connected resistors 373 and 374, all in a manner explained in Section 7.

The baking operation continues until 5:00 o'clock, whereupon the time clock controller 530 operates the contacts 535 and 536 into disengagement, thereby to remove the application of power from the conductor 382, with the result that the relay 470 is retained in its restored position retaining the contactor 520 in its restored position, so that the bake unit 516 and the broil unit 515 are deenergized. At this time, the baking operation is thus terminated at the stop-clock time of 5:00 o'clock.

It will be understood that the cooking operation described proceeded under the control of the time clock controller 530 for the preset time interval of 1 hour and 15 minutes; and moreover, the temperature in the oven cavity 102 was maintained at the temperature preset by the preselection of the resistors 373 and 374 as a consequence of the placing of the particular oven cooking control card 600 into the magazine 300, as previously explained. In order to restore the control of the oven cavity 102 to the manually operable oven controller 400, it is only necessary for the cook to remove the card 600 from the magazine 300; whereby at this time, the feelers 311 to 321, inclusive, incorporated in the magazine 300 are returned into their normal positions effecting the return of the switch springs 322 to 353, inclusive, back into their normal positions, as illustrated in FIG. 3.

SECTION 10

*A Continuous Regular Broiling Operation in the Oven Cavity 102 Under the Control of the Individually Associated Oven Controller 400*

In order to carry out a continuous regular broiling operation in the oven cavity 102, the individually associated manually operable oven controller 400 is operated out of its "off" position into its "broil" position, as indicated by the cooperating index marker 403. This rotation of the operating shaft 401 effects closure of the switches 432, 433, 434 and 437. Of course, it is assumed that no oven cooking control card 600, etc., is disposed in the magazine 300; and it is further assumed that the manually operable controller 540 occupies its "manual control" position. Closure of the switch 432 connects the line conductor 241 to the conductor 279; whereby the limiting resistor 457 limits the current conducted through the crystal rectifier 458, and the crystal rectifier 458 effects the supply of B+ potential upon the conductor 388, which potential is connected via the limiting resistor 459 to the conductor 473, and thence to the anode of the triode section 454, for a purpose more fully explained below. Also, the supply of power to the conductor 279 effects energization of the primary winding 361 of the transformer 360; whereby the voltage induced in the secondary winding 362 thereof is impressed between the conductors 381 and 387 and thence directly to the input terminals of the oven bridge 450. Closure of the switch 433 connects the line conductor 242 to the conductor 379 and via the closed switch springs 342—343 to the conductor 380 terminated by one terminal of the broil unit 515. Closure of the switch 434 preselects and connects the broil resistor 491 to the oven bridge 450. More particularly, one terminal of the broil resistor 491 is connected via the conductor 485, the closed switch springs 327—328 to the conductor 472 terminated by one of the input terminals of the bridge 450; and the other terminal of the broil resistor 491 is connected via the closed switch 434 to the conductor 381 terminated by the other input terminal of the bridge 450. Closure of the switch 437 connects the line conductor 241 to the conductor 494 terminated by the switch spring 549 that is engaged by the switch spring 548 that terminates the conductor 383; the conductor 383 being further connected via the engaged switch springs 351—352 to the conductor 384 that is terminated by one terminal of the relay 470.

At this time, it is assumed that the food to be broiled is suitably supported in the oven cavity 102 with the door 120 in its substantially closed position, but slightly ajar so as to define a ventilating crack adjacent to the top of the front opening thereinto, in the usual manner, that the oven cavity 102 is cold, and that accordingly, the thermistor 451 arranged in heat exchange relation with the oven cavity 102 senses the cold temperature. Hence the resistance of the thermistor 451 is exceedingly high, with the result that the bridge 450 is severely unbalanced, thereby applying via the conductor 472 a large bias to the control grid of the triode section 454, with the result that the triode section is rendered non-conductive; whereby the bias supplied via the capacitor 462 to the conductor 474 and thence to the control grid of the tetrode section 455 is small rendering the tetrode section 455 conductive. Accordingly, the relay 470 is energized, the circuit extending from the line conductor 241 via the closed switch 437, the conductor 494, the closed switch springs 549—548, the conductor 383, the closed switch springs 351—352, the conductor 384 and the winding of the relay 470 to the conductor 475 extending to the anode of the tetrode section 455, the cathode of the tetrode section 455 being connected to the grounded neutral conductor 243. Thus the relay 470 operates closing its contacts 471; whereby the grounded neutral conductor 243 is connected to the conductor 385, with the result that the contactor 520 operates. Upon operating, the contactor 520 completes, at its contact bridging member and its front contacts, a circuit including the conductor 504 for bridging the broil unit 515 across the conductor 279 and 380. The conductor 279 is connected to the line conductor 241 via the closed switch 432; the conductor 380 is connected to the line conductor 242, via the closed switch springs 343—342, the conductor 379 and the closed switch 433. Moreover, it is noted that in this case, while the contact bridging member 521 of the contactor 520 closes its front contacts, the bake unit 516 is not energized, by virtue of the fact that the switch 435 occupies its open position. Hence, the bake unit 516 is deenergized, while the broil unit 515 is energized across the line conductors 241 and 242 at 236-volts. Thus, in the broiling operation, all of the heat is generated in the upper portion of the oven cavity 102 by the broil unit 515. Accordingly, the temperature in the oven cavity 102 rises rapidly; whereby the temperature of the thermistor 451 increases. More specifically, the resistance of the thermistor 451 decreases in proportion to the increase of the temperature thereof, resulting from the sensing of the temperature in the oven cavity 102.

As the resistance of the thermistor 451 decreases, the balance of the bridge 450 is improved, with the result that the bias applied therefrom to the conductor 472 and thence to the control grid of the triode section 454 is reduced. Ultimately, when the temperature sensed by the thermistor 451 matches that pre-established by the selection of the broil resistor 491 by the oven controller 400 in its "broil" position, the bridge 450 is substantially balanced; whereby the bias applied to the conductor 472 and thence to the control grid of the triode section 454 is substantially removed; whereby the triode section 454 is rendered conductive, with the result that the bias applied via the conductor 473 and the capacitor 462 is increased; whereby this bias applied via the conductor 474 to the control grid of the tetrode section 455 drives the tetrode section 455 substantially to cut-off, with the result that the current traversing the winding of the relay 470 is reduced effectively to bring about the restoration of the relay 470. Upon restoring, the relay 470 effects the restoration of the contactor 520; whereby the contactor 520 interrupts the previously traced circuit for energizing the broil unit 515, with the result that further heating thereof at this time is arrested. Of course, the thermistor 451 cooperates with the preselected broil resistor 491 selectively to control the balance of the bridge 450 and consequently the positioning of the relay 470 and the contactor 520 for the purpose of maintaining the preset temperature in the oven cavity 102 as established by the preselection of the broil resistor 451 with the oven controller 400 in its "broil" position; all in the manner substantially identical to that described in Section 7. Accordingly, the supply of heat energy to the broiling unit 515 is modulated to maintain substantially the temperature in the oven cavity at that preset by the preselection of the broil resistor 491, as a result of the setting of the dial 402 in its "broil" position in cooperation with the associated index marker 403.

The foregoing broiling operation proceeds on a continuous basis until the manual dial 402 is operated back into its "off" position; whereby all of the switches 431 to 439, inclusive, are returned to their normal open positions so as to restore the circuit network into its normal condition.

SECTION 11

*A Continuous Rotary Broiling Operation in the Oven Cavity 102 Under the Control of the Individually Associated Oven Controller 400*

In order to carry out a continuous rotary broiling operation in the oven cavity 102, the individually associated manually operable oven controller 400 is operated out of its "off" position into its "rotary-broil" position, as indicated by the cooperating index marker 403. This rotation of the operating shaft 401 effects closure of the switches 432, 433, 437, 438 and 439. Of course, it is assumed that no oven cooking control card 600, etc., is disposed in the magazine 300, and it is further assumed that the manually operable controller 540 occupies its "manual control" position. Furthermore, it is assumed that the food to be broiled is arranged on the spit, not shown, disposed in the oven cavity 102, and that the spit mentioned is suitably chucked with respect to the spit chuck 121 of the spit mechanism 110, and that the door 120 is substantially closed, but slightly ajar, so as to define a ventilating crack adjacent to the top of the front opening thereinto, in the usual manner.

This rotary broiling operation in the oven cavity proceeds in a manner substantially identical to the regular oven broiling operation in the oven cavity 102, as described above in Section 10, except for two important particulars, explained below. In this special case, when the dial 402 is in its "rotary-broil" position, the closure of the switch 439 connects the grounded neutral conductor 243 to the conductor 386, with the result that the rotary-broil motor 550 is energized, the motor 550 being bridged across the conductors 386 and 380; and the conductors 380 being connected via the closed switch springs 343—342, the conductor 379 and the closed switch 433 to the line conductor 242. Accordingly, in this case, the motor 550 is operated, so as to effect operation of the spit mechanism 110, with the result that the spit chuck 121 is rotated bringing about rotation of the associated spit and the food carried thereby that is supported in the oven cavity 102.

Also, in this special case, closure of the switch 438 (instead of the switch 434) connects the rotary broil resistor 492 (instead of the regular broil resistor 491) across the conductors 485 and 381. Hence in this case, the rotary broil resistor 492 (instead of the regular broil resistor 491) is connected to the input terminals of the bridge 450; whereby the resistance of the thermistor 451 is matched against the resistance of the rotary broil resistor 492, for the purpose of controlling the balance of the bridge 450 and consequently the positions of the relay 470 and the contactor 520; whereby the contactor 520 operates and restores in order selectively to energize and to deenergize the broil unit 515 across the conductors 279 and 380 at 236-volts, with the result that the heat energy supplied to the broil unit 515 is modulated, so as to maintain the temperature in the oven cavity 102 as sensed by the thermistor 451 substantially at the temperature established by the preselection of the rotary broil resistor 492 by the dial 402 in its "rotary-broil" position. The foregoing rotary broiling operation proceeds on a continuous basis until the manual dial 402 is operated back into its "off" position; whereby all of the switches 431 to 439, inclusive, are returned to their normal open positions; so as to restore the circuit network into its normal condition.

SECTION 12

*Other Automatic Card Controlled Cooking Operations Involving the Surface Heating Unit 501 and Other Automatic Card Controlled Cooking Operations Involving the Oven Cavity 102*

In view of the foregoing description of the composite construction of the combination cooking control card 800 appearing in Section 2, it will be understood that the insertion of the combination cooking control card 800, with the front side thereof toward the cook, into the casing 301 of the card magazine 300 is effective to bring about an automatic cooking operation involving the surface heating unit 501 that is identical to that previously described in Section 6; on the other hand, the insertion of the combination cooking control card 800, with the back side thereof toward the cook, into the casing 301 of the card magazine 300, is effective to bring about an automatic cooking operation involving the oven cavity 102 that is identical to that previously described in Section 9.

Also, it will be understood that a series of the surface unit cooking control cards, including the card 700, will be provided in conjunction with the electric range 100 so that the selective insertions of the various ones of these surface unit cooking control cards into the magazine 300 will bring about corresponding automatic cooking operations involving the surface unit 501, and substantially identical to the automatic cooking operation described in Section 6, but involving different time intervals of the cooking operations and involving different temperatures of the cooking operations. Likewise, a series of the oven cooking control cards, including the card 600, will be provided in conjunction with the electric range 100 so that the selective insertions of the various ones of these oven cooking control cards into the magazine 300 will bring about corresponding automatic cooking operations involving the oven cavity 102, and substantially identical to the automatic cooking operation described in Section 9, but involving different time intervals of the cooking operations and involving different temperatures of the cooking operations. More particularly, it will be appreciated that the length of the rack 602, 702, etc., provided on the right-hand edge of the cooking control card 600, 700, etc., may be suitably varied so as correspondingly to set a variable cooking time interval into the time clock controller 530, since the length of the cooking time interval mentioned is proportional to the rotation of the pinion 302 in the magazine 300, that, in turn, is proportional to the length of the rack mentioned. Also, it will be appreciated that the particular arrangement of the holes or apertures provided in the positions of the various cooking control cards that respectively cooperate with the feelers 314, 315, 316 and 317 in the magazine 300 may be suitably varied in order to bring about any combination, as may be desired, of the connection of the various ones of the resistors 371, 372, 373 and 374 across the conductors 375 and 389; which combinations of resistors mentioned variably preset the balance of the corresponding one of the bridges 250 or 450 and thus the temperature against which the corresponding one of the thermistors 251 or 451 is matched in order to obtain a balance of the corresponding one of the bridges 250 or 450. Specifically, it will be appreciated that as the composite resistance between the conductors 375 and 389 is set progressively lower, a balance of the bridge 250 or 450 is achieved only at a progressively higher temperature.

Turning now to the use of the oven cooking control card 900 in the magazine 300, it will be appreciated that the basic controls carried out in the circuit network are substantially the same as those previously described in Section 9, by virtue of the fact that the utilization of the card 900 brings about an automatic cooking operation involving the oven cavity 102. However, in this case, the oven control card 900 is constructed somewhat differently than the corresponding oven control cards 600 and 800 in that the card 900 does not comprise adjacent to the opposite ends thereof, the shoulders 603 and 803 that are provided adjacent to the opposite sides of the cards 600 and 800 mentioned, since it is contemplated that the card 900 will be variably inserted in the vertical direction with respect to the cooperating casing 301 of the magazine 300 for the purpose of effecting corresponding variable rotations of the pinion 302 and the consequent introduction of corresponding variable cooking time intervals into the time clock controller 530. Specifically, the time interval that is introduced into the time clock controller 530 is dependent upon the amount of vertical insertion of the card 900 into the casing 301, since the variable amount of the vertical insertion mentioned causes a corresponding variable amount of the rack 902 and 902′ provided on the side edge of the card 900 that is employed, to be utilized in the variable rotation of the pinion 302 for the preestablishment of the variable cooking control time interval mentioned.

The constructions of the various cooking control cards 600, 700, 800 and 900 have been shown and described only by way of illustration, as it will be readily apparent that many forms and geometries of the cooking control cards may be readily devised for insertion into the magazine 300, in order to carry out the desired surface unit and oven cooking operations as may be convenient. For example, it is apparent that a substantially square card may be readily designed for the purpose of carrying out selectively four different cooking control operations based upon the particular one of its four sides that is inserted into a bottom position into the card magazine 300.

Also, it is contemplated that for the convenience of the cook, the cooking control cards 600, 700, 800, 900, etc., may incorporate different colors, and may also carry printed recipes indicating the time intervals and the cooking temperatures that will be enforced by the utilization of the cards in the card magazine 300; and moreover, the recipes mentioned may set forth the required weights and measures of the various ingredients that are necessary for the purpose of successful carrying out of the recipes.

SECTION 13

*Conclusions*

In view of the foregoing, it is apparent that there has been provided in an electric range an improved combination manual and automatic time and temperature control system that may be employed selectively to carry out both surface unit cooking operations and oven cooking operations in a ready and simple manner. Also, it will be appreciated that by the utilization of the various preformed cooking control cards in the card magazine, the cook may readily carry out various and sundry precise cooking operations involving a wide variety of particular recipes merely by the utilization of the proper one of the cooking control cards in the card magazine. Also, the arrangement accommodates the full manual control of both the surface heating unit and the oven when a cooking control card is not employed; and moreover, the arrangement accommodates the manual control of either one of the cooking facilities mentioned, while the other of the cooking facilities mentioned is being controlled by one of the cooking control cards.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance, a first heating unit adapted to support a cooking vessel, a first manually operable controller having a plurality of control positions respectively corresponding to different desired temperatures of a cooking vessel supported by said first heating unit, a first temperature sensing unit arranged to sense the temperature of a cooking vessel supported by said first heating unit, a first control circuit governed jointly by said first controller in one of its control positions and by said first temperature sensing unit for selectively supplying heat energy to said first heating unit to maintain the temperature of a cooking vessel supported thereby substantially at that preset by said first controller in its one control position, a second heating unit operatively associated with an oven cavity, a second manually operable controller having a plurality of control positions respectively corresponding to different desired temperatures of said oven cavity, a second temperature sensing unit arranged to sense the temperature of said oven cavity, a second control circuit governed jointly by said second controller in one of its control positions and by said second temperature sensing unit for selectively supplying heat energy to said second heating unit to maintain the temperature of said oven cavity substantially at that preset by said second controller in its one control position, a card magazine adapted selectively to receive a removable cooking control card, a first cooking control card adapted to be placed in said magazine, a third control circuit governed jointly by said first card in said magazine and by said first temperature sensing unit for selectively supplying heat energy to said first heating unit to maintain the temperature of a cooking vessel supported thereby substantially at a first given temperature pre-established by said first card in said magazine, a second cooking control card adapted to be placed in said magazine, and a fourth control circuit governed jointly by said second card in said magazine and by said second temperature sensing unit for selectively supplying heat energy to said second heating unit to maintain the temperature of said oven cavity substantially at a second given temperature pre-established by said second card in said magazine.

2. The cooking appliance set forth in claim 1, and further comprising clock mechanism operatively associated with said magazine, means responsive to said first card in said magazine for registering a first cooking time interval in said clock mechanism pre-established by said first card in said magazine, means controlled by said clock mechanism for limiting said governing of said third control circuit to said registered first cooking time interval, means responsive to said second card in said magazine for registering a second cooking time interval in said clock mechanism pre-established by said second card in said magazine, and means controlled by said clock mechanism for limiting said governing of said fourth control circuit to said registered second cooking time interval.

3. In a cooking appliance, a heating unit, a manually operable controller having a plurality of control positions respectively corresponding to different desired temperatures of a medium heated by said heating unit, a temperature sensing unit arranged to sense the temperature of the medium heated by said heating unit, a first control system governed jointly by said controller in one of its control positions and by said temperature sensing unit for selectively governing the supply of heat energy to said heating unit to maintain the temperature of the medium heated by said heating unit substantially at that preset by said controller in its one control position, a card magazine adapted selectively to receive a removable cooking control card, a cooking control card adapted to be placed in said magazine, and a second control system governed jointly by said card in said magazine and by said temperature sensing unit for selectively governing the supply of heat energy to said heating unit to maintain the temperature of the medium heated by said heating unit substantially at a given temperature pre-established by said card in said magazine.

4. In a cooking appliance, a heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position opening said enabled first control circuit and an on position closing said enabled first control circuit, clock mechanism, means responsive to placement of said card in said magazine for registering in said clock mechanism a given time interval pre-established by said card in said magazine, switching apparatus governed by said clock mechanism for closing said enabled second control circuit throughout said registered time interval, and means governed by the closure of either one of said control circuits for supplying heat energy to said heating unit.

5. In a cooking appliance, a heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position and a plurality of control positions respectively corresponding to different desired temperatures of a medium heated by said heating unit, said controller in its off position opening said enabled first control circuit and in any one of its control positions closing said enabled first circuit and also presetting the corresponding desired temperature of a medium heated by said heating unit, clock mechanism, means responsive to placement of said card in said magazine for presetting a given desired temperature of a medium heated by said heating unit and for registering in said clock mechanism a given time interval both pre-established by said card in said magazine, switching apparatus governed by said clock mechanism for closing said enabled second control circuit throughout said registered time interval, and means governed by the closure of either one of said control circuits for selectively supplying heat energy to said heating unit in order to maintain the temperature of the medium heated by said heating unit substantially at said preset temperature.

6. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position and a plurality of control positions respectively corresponding to different desired temperatures of a medium heated by said heating unit, said controller in its off position opening said enabled first control circuit and in any one of its control positions closing said enabled first circuit and also presetting the corresponding desired temperature of a medium heated by said heating unit, means responsive to placement of said card in said magazine for closing said enabled second circuit and also for presetting a given desired temperature of a medium heated by said heating unit pre-established by said card in said magazine, and means governed by the closure of either one of said control circuits for selectively energizing said heating unit in order to maintain the temperature of the medium heated by said heating unit substantially at said preset temperature.

7. In a cooking appliance, an electric heating unit, a manually operable controller having a plurality of control positions respectively corresponding to different desired temperatures of a medium heated by said heating unit, a temperature sensing unit arranged to sense the temperature of the medium heated by said heating unit, a first control circuit governed jointly by said controller in one of its control positions and by said temperature sensing unit for selectively energizing said heating unit to maintain the temperature of the medium heated by said heating unit substantially at that preset by said controller in its one control position, a card magazine adapted selectively to receive a removable cooking control card, a cooking control card adapted to be placed in said magazine, and a second control circuit governed jointly by said card in said magazine and by said temperature sensing unit for selectively energizing said heating unit to maintain the temperature of the medium heated by said heating unit substantially at a given temperature pre-established by said card in said magazine.

8. The cooking appliance set forth in claim 7, wherein said heating unit is operatively associated with a heating platform and said temperature sensing unit is arranged to sense the temperature of a cooking vessel supported by said heating platform.

9. The cooking appliance set forth in claim 7, wherein said heating unit is operatively associated with an oven cavity and said temperature sensing unit is arranged to sense the temperature in said oven cavity.

10. The cooking appliance set forth in claim 7, and further comprising an interlock system responsive to placement of said card in said magazine for disabling said first control circuit and for enabling said second control circuit and responsive to removal of said card from said magazine for disabling said second control circuit and for enabling said first control circuit.

11. In a cooking appliance, an electric heating unit, a first resistor having a high temperature coefficient of resistance and arranged in heat-exchange relation with a medium heated by said heating unit so that said first resistor has an effective resistance that is related to the temperature of the medium that is heated by said heating unit, a bridge circuit including said first resistor, a second variable resistor, a manually operable controller for selectively varying said second resistor, a third fixed resistor, a card magazine adapted selectively to receive a removable cooking control card, a cooking control card adapted to be placed in said magazine, means responsive to placement of said card in said magazine for disconnecting said second resistor from said bridge circuit and for connecting said third resistor into said bridge circuit and responsive to removal of said card from said magazine for disconnecting said third resistor from said bridge circuit and for connecting said second resistor into said bridge circuit, the balance of said bridge circuit being determined jointly by the effective resistance of said first resistor and by the resistance of the connected one of said second or third resistors, and means governed by the balance of said bridge circuit for selectively energizing said heating unit.

12. In a cooking appliance, an electric heating unit, a manually operable controller having a plurality of control positions respectively corresponding to different desired temperatures of a medium heated by said heating unit, a temperature sensing unit arranged to sense the temperature of the medium heated by said heating unit, a first control circuit governed jointly by said controller in one of its control positions and by said temperature sensing unit for selectively energizing said heating unit to maintain the temperature of the medium heated by said heating unit substantially at that preset by said controller in its one control position, a card magazine adapted selectively to receive a removable cooking control card, a cooking control card corresponding to a given temperature of the medium heated by said heating unit and adapted to be placed in said magazine, and a second control circuit governed jointly by said card in said magazine and by said temperature sensing unit for selectively energizing said heating unit to maintain the temperature of the medium heated by said heating unit substantially at said given temperature pre-established by said card in said magazine.

13. In a cooking appliance, an electric heating unit, a manually operable controller having a plurality of control positions respectively corresponding to different desired temperatures of a medium heated by said heating unit, a temperature sensing unit arranged to sense the temperature of the medium heated by said heating unit, a first control circuit governed jointly by said controller in one of its control positions and by said temperature sensing unit for selectively energizing said heating unit to maintain the temperature of the medium heated by said heating unit substantially at that preset by said controller in its one control position, a card magazine adapted selectively to receive a removable cooking control card, a plurality of cooking control cards respectively corresponding to different given temperatures of the medium heated by said heating unit and adapted to be placed individually in said magazine, and a second control circuit governed jointly by one of said cards in said magazine and by said temperature sensing unit for selectively energizing said heating unit to maintain the temperature of the medium heated by said heating unit substantially at the given temperature pre-established by said one card in said magazine.

14. In a cooking appliance, an electric heating unit, a manually operable controller having a plurality of control positions respectively corresponding to different desired temperatures of a medium heated by said heating unit, a temperature sensing unit arranged to sense the temperature of the medium heated by said heating unit, a first control circuit governed jointly by said controller in one of its control positions and by said temperature sensing unit for selectively energizing said heating unit to maintain the temperature of the medium heated by said heating unit substantially at that preset by said controller in its one control position, a card magazine adapted selectively to receive a removable cooking control card, a cooking control card adapted to be placed in any one of a plurality of different positions thereof in said magazine, the different placement positions of said card in said magazine respectively corresponding to different given temperatures of the medium heated by said heating unit, and a second control circuit governed jointly by the particular position of said card in said magazine and by said temperature sensing unit for selectively energizing said heating unit to maintain the temperature of the medium heated by said heating unit substantially at the given temperature pre-established by the particular position of said card in said magazine.

15. The cooking appliance set forth in claim 14, wherein two of the positions of said card in said magazine respectively comprise front and back positions of said card.

16. The cooking appliance set forth in claim 14, wherein two of the positions of said card in said magazine respectively comprise two different edges of said card in a fixed location.

17. In a cooking appliance, an electric heating unit, a temperature sensing unit arranged to sense the temperature of the medium heated by said heating unit, a card magazine adapted selectively to receive a removable cooking control card, a plurality of cooking control cards respectively corresponding to different given temperatures of the medium heated by said heating unit and adapted to be placed individually in said magazine, switching apparatus arranged in said magazine and selectively operated into a plurality of different settings in accordance with the different ones of said cards placed in said magazine, whereby the different settings of said switching apparatus also respectively correspond to the different given temperatures of the medium heated by said heating unit, and a control circuit governed jointly by one of the settings of said switching apparatus and by said temperature sensing unit for selectively energizing said heating unit to maintain the temperature of the medium heated by said heating unit substantially at the given temperature pre-established by said one setting of said switching apparatus.

18. The cooking appliance set forth in claim 17, wherein said cards have different patterns of holes formed therein, and said switching apparatus is selectively operated into its different settings in accordance with the different patterns of the holes formed in the different ones of said cards placed in said magazine.

19. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position opening said enabled first control circuit and an on position closing said enabled first control circuit, clock mechanism, means responsive to placement of said card in said magazine for registering in said clock mechanism a given time interval pre-established by said card in said magazine, switching apparatus governed by said clock mechanism for closing said enabled second control circuit throughout said registered time interval, and means governed by the closure of either one of said control circuits for energizing said heating unit.

20. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position opening said enabled first control circuit and an on position closing said enabled first control circuit, clock mechanism selectively operative to register a desired start time and also to register a desired stop time and provided with manually operable facility for selectively registering therein a desired stop time, means responsive to placement of said card in said magazine for registering in said clock mechanism a desired start time pre-established by said card in said magazine, switching apparatus selectively operated by said clock mechanism, said switching apparatus being operated to close said enabled second control circuit at said registered start time and being operated to open said enabled second control circuit at said registered stop time, and means governed by the closure of either one of said control circuits for energizing said heating unit.

21. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position opening said enabled first control circuit and an on position closing said enabled first control circuit, clock mechanism selectively operative to register a desired stop time and also to register a desired start time and provided with first manually operable facility for selectively registering therein a desired stop time and also provided with second manually operable facility for selectively registering therein a desired start time, means responsive to placement of said card in said magazine for disabling said second manually operable facility and for automatically registering in said clock mechanism a desired start time pre-established by said card in said magazine, switching apparatus selectively operated by said clock mechanism, said switching apparatus being operated to close said enabled second control circuit at said registered start time and being operated to open said enabled second control circuit at said registered stop time, and means governed by the closure of either one of said control circuits for energizing said heating unit.

22. In a cooking appliance, an electric heating unit, a card magazine adapted selectively to receive a removable cooking control card, a plurality of cooking control cards respectively corresponding to different given time intervals and adapted to be placed individually in said magazine, first and second control circuits, an interlock system responsive to placement of any one of said cards in said magazine for disabling said first control circuit and for enabling said second control circuit and responsive to removal of said one card from said magazine for disabling said second control circuit and for enabling said first control circuit, a manually operable controller having an off position opening said enabled first control circuit and an on position closing said enabled first control circuit, clock mechanism, means responsive to placement of one of said cards in said magazine for registering in said clock mechanism a corresponding given time interval pre-established by said one card in said magazine, switching apparatus governed by said clock mechanism for closing said enabled second control circuit throughout said registered time interval, and means governed by the closure of either one of said control circuits for energizing said heating unit.

23. In a cooking appliance, an electric heating unit, a card magazine adapted selectively to receive a removable cooking control card, a cooking control card adapted to be placed in any one of a plurality of different positions thereof in said magazine, the different placement positions of said card in said magazine respectively corresponding to different given time intervals, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position opening said enabled first control circuit and an on position closing said enabled first control circuit, clock mechanism, means responsive to placement of said card in a particular one of its positions in said magazine for registering in said clock mechanism the corresponding given time interval pre-established by said one position of said card in said magazine, switching apparatus governed by said clock mechanism for closing said enabled second control circuit throughout said registered time interval, and means governed by the closure of either one of said control circuits for energizing said heating unit.

24. The cooking appliance set forth in claim 23, wherein two of the positions of said card in said magazine respectively comprise front and back positions of said card.

25. The cooking appliance set forth in claim 23, wherein two of the positions of said card in said magazine respectively comprise two different edges of said card in a fixed location.

26. The cooking appliance set forth in claim 19, wherein said means responsive to placement of said card in said magazine for registering in said clock mechanism a given time interval pre-established by said card in said magazine essentially comprises a rack carried by an edge of said card and a cooperating pinion arranged in said magazine.

27. In a cooking appliance, an electric heating unit, a card magazine adapted selectively to receive a removable cooking control card, a plurality of cooking control cards respectively corresponding to different given time intervals and adapted to be placed individually in said magazine, clock mechanism, means responsive to placement of one of said cards in said magazine for registering in said clock mechanism a corresponding given time interval pre-established by said one card in said magazine, a control circuit, switching apparatus governed by said clock mechanism for closing said control circuit throughout said registered time interval, and means governed by the closure of said control circuit for energizing said heating unit.

28. The cooking appliance set forth in claim 27, wherein said cards respectively carry racks along the marginal edges thereof that are of different lengths, said magazine includes a pinion that is arranged to cooperate with the rack carried by a card placed therein, whereby said different cards impart different angular rotations to said pinion incident to placement thereof in said magazine, and said different angular rotations of said pinion register different time intervals in said clock mechanism.

29. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position and a plurality of control positions respectively corresponding to different desired temperatures of a medium heated by said heating unit, said controller in its off position opening said enabled first control circuit and in any one of its control positions closing said enabled first circuit and also presetting the corresponding desired temperature of a medium heated by said heating unit, clock mechanism, means responsive to placement of said card in said magazine for presetting a given desired temperature of a medium heated by said heating unit and for registering in said clock mechanism a given time interval both pre-established by said card in said magazine, switching apparatus governed by said clock mechanism for closing said enabled second control circuit throughout said registered time interval, and means governed by the closure of either one of said control circuits for selectively energizing said heating unit in order to maintain the temperature of the medium heated by said heating unit substantially at said preset temperature.

30. In a cooking appliance, an electric heating unit, a card magazine adapted selectively to receive a removable cooking control card, a cooking control card adapted to be placed in said magazine, first and second control circuits, an interlock system responsive to placement of said card in said magazine for disabling said first control circuit and for enabling said second control circuit and responsive to removal of said card from said magazine for disabling said second control circuit and for enabling said first control circuit, a manually operable controller having an off position and a plurality of control positions respectively corresponding to different desired temperatures of a medium heated by said heating unit, said controller in its off position opening said enabled first control circuit and in any one of its control positions closing said enabled first circuit and also presetting the corresponding desired temperature of a medium heated by said heating unit, clock mechanism, means responsive to placement of said card in said magazine for presetting a given desired temperature of a medium heated by said heating unit and for registering in said clock mechanism a given time interval both pre-established by said card in said magazine, switching apparatus governed by said clock mechanism for closing said enabled second control circuit throughout said registered time interval, a temperature sensing unit arranged to sense the temperature of the medium heated by said heating unit, and means governed jointly by the closure of either one of said control circuits and by said temperature sensing unit for selectively energizing said heating unit in order to maintain the temperature of the medium heated by said heating unit substantially at said preset temperature.

31. The cooking appliance set forth in claim 30, wherein said heating unit is operatively associated with a heating platform and said temperature sensing unit is arranged to sense the temperature of a cooking vessel supported by said heating platform.

32. The cooking appliance set forth in claim 30, wherein said heating unit is operatively associated with an oven cavity and said temperature sensing unit is arranged to sense the temperature in said oven cavity.

33. In a cooking appliance, a plurality of cooking areas, a corresponding plurality of heating units respectively operatively associated with said cooking areas, a corresponding plurality of manually operable controllers respectively operatively associated with said heating units, each one of said controllers being normally able to control the supply of heat energy to the associated one of said heating units and to preset the temperature of the cooking operation in the corresponding one of said cooking areas, a card magazine adapted selectively to receive a removable cooking control card, a plurality of cooking control cards respectively corresponding to said different cooking areas and adapted to be placed individually in said magazine, and means responsive to the placement in said magazine of any one of said cards corresponding to one of said cooking areas for disabling the corresponding one of said controllers and for presetting a corresponding given temperature for the cooking operation in the corresponding one of said cooking areas.

34. The cooking appliance set forth in claim 33, and further comprising clock mechanism operatively associated with said magazine, means also controlled by placement of any one of said cards in said magazine for registering in said clock mechanism a cooking time interval pre-established by said one card in said magazine, and means governed by said clock mechanism for limiting to said registered time interval the cooking operation in the one of said cooking areas corresponding to said one card in said magazine.

References Cited in the file of this patent

UNITED STATES PATENTS

| | | |
|---|---|---|
| 2,236,624 | Littwin | Apr. 1, 1941 |
| 2,573,405 | Clark | Oct. 30, 1951 |
| 2,715,703 | Shuck | Aug. 16, 1955 |
| 2,721,926 | Baird | Oct. 25, 1955 |
| 2,819,371 | Aldrich et al. | Jan. 7, 1958 |
| 2,823,290 | Warner | Feb. 11, 1958 |